(12) United States Patent
Ashida et al.

(10) Patent No.: US 9,364,755 B1
(45) Date of Patent: Jun. 14, 2016

(54) METHODS AND APPARATUS FOR USING ILLUMINATION MARKS FOR SPATIAL POINTING

(75) Inventors: Kenichiro Ashida, Kyoto (JP); Junji Takamoto, Kyoto (JP); Yoshitomo Goto, Kyoto (JP); Fumiyoshi Suetake, Kyoto (JP); Akio Ikeda, Kyoto (JP); Susumu Inoue, Kyoto (JP); Shin Sugiyama, Kyoto (JP); Kuniaki Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 646 days.

(21) Appl. No.: 13/230,953

(22) Filed: Sep. 13, 2011

Related U.S. Application Data

(60) Division of application No. 11/745,842, filed on May 8, 2007, which is a continuation-in-part of application No. 29/268,255, filed on Nov. 2, 2006, now Pat. No. Des. 589,965, and a continuation-in-part of (Continued)

(51) Int. Cl.
| | |
|---|---|
| *A63F 9/24* | (2006.01) |
| *A63F 13/00* | (2014.01) |
| *A63F 13/20* | (2014.01) |
| *A63F 13/219* | (2014.01) |

(Continued)

(52) U.S. Cl.
CPC .................. *A63F 13/20* (2014.09); *A63F 13/04* (2013.01); *A63F 13/213* (2014.09); *G06F 3/0304* (2013.01); *G06F 3/0325* (2013.01); *G06F 3/0346* (2013.01)

(58) Field of Classification Search
CPC ......... A63F 13/00; A63F 13/06; A63F 13/20; A63F 13/213; A63F 2300/1006; A63F 2300/1043; A63F 2300/1087; G06F 3/016; G06F 3/0304; G06F 3/0317; G06F 3/0325; G06F 3/0346; F21Y 2101/02
USPC .................... 463/47, 36–39, 46; 362/85, 240, 362/249.02–249.06
See application file for complete search history.

(56) References Cited

U.S. PATENT DOCUMENTS

| | | | |
|---|---|---|---|
| 4,839,838 A | 6/1989 | LaBiche et al. | |
| 4,862,152 A | 8/1989 | Milner | |

(Continued)

FOREIGN PATENT DOCUMENTS

| | | |
|---|---|---|
| JP | 3-74434 | 7/1991 |
| JP | 6-50758 | 2/1994 |

(Continued)

OTHER PUBLICATIONS

U.S. Appl. No. 11/745,842, filed May 2007, Ashida et al.

(Continued)

*Primary Examiner* — Milap Shah
(74) *Attorney, Agent, or Firm* — Nixon & Vanderhye, P.C.

(57) ABSTRACT

An elongated member such as a bar includes spaced-apart infrared light illumination ports at opposite ends thereof. Exemplary spacing between the two spaced-apart light ports may be 20 centimeters or more. Each light port comprises an array of plural light sources. The plural light sources in each array may be directionally aimed to as to provide different illumination directions. The plural light sources in each array may emit different colors or frequencies of light. Example applications include targeting or marking capabilities for a video game or other system handheld pointing device.

26 Claims, 31 Drawing Sheets

Related U.S. Application Data application No. 29/268,254, filed on Nov. 2, 2006, now Pat. No. Des. 583,876.

(60) Provisional application No. 60/746,769, filed on May 8, 2006.

(51) Int. Cl.
*A63F 13/213* (2014.01)
*G06F 3/03* (2006.01)
*G06F 3/0346* (2013.01)

(56) References Cited

U.S. PATENT DOCUMENTS

| | | | |
|---|---|---|---|
| 5,009,501 A * | 4/1991 | Fenner | A63F 13/04 250/203.3 |
| 5,181,181 A | 1/1993 | Glynn | |
| 5,325,133 A | 6/1994 | Adachi | |
| 5,440,326 A | 8/1995 | Quinn | |
| 5,574,479 A * | 11/1996 | Odell | 345/158 |
| 5,598,187 A | 1/1997 | Ide et al. | |
| 5,616,901 A | 4/1997 | Crandall | |
| 5,623,358 A | 4/1997 | Madey | |
| 5,627,565 A | 5/1997 | Morishita et al. | |
| 5,645,077 A | 7/1997 | Foxlin | |
| 5,710,623 A | 1/1998 | Kim | |
| 5,757,360 A | 5/1998 | Nitta et al. | |
| 5,757,530 A | 5/1998 | Crandall, Jr. | |
| 5,796,354 A | 8/1998 | Cartabiano et al. | |
| 5,796,387 A * | 8/1998 | Curran | A63F 13/04 345/157 |
| 5,867,146 A | 2/1999 | Kim et al. | |
| 6,002,138 A | 12/1999 | Bond et al. | |
| 6,012,980 A * | 1/2000 | Yoshida | A63F 13/04 250/221 |
| 6,184,863 B1 | 2/2001 | Sibert | |
| 6,283,612 B1 | 9/2001 | Hunter | |
| 6,297,802 B1 | 10/2001 | Fujioka | |
| 6,424,410 B1 * | 7/2002 | Pelosi | G01S 3/784 356/139.03 |
| 6,450,664 B1 | 9/2002 | Kelly | |
| RE37,929 E | 12/2002 | Fernandez | |
| 6,498,860 B1 * | 12/2002 | Sasaki | A63F 13/06 382/103 |
| 6,545,661 B1 | 4/2003 | Goschy et al. | |
| 6,636,199 B2 | 10/2003 | Kobayashi | |
| 6,640,337 B1 | 10/2003 | Lu | |
| 6,659,623 B2 | 12/2003 | Friend | |
| 6,903,674 B2 | 6/2005 | Hoesel et al. | |
| 6,967,644 B1 | 11/2005 | Kobayashi | |
| 6,982,697 B2 | 1/2006 | Wilson et al. | |
| 7,039,218 B2 | 5/2006 | Lin | |
| 7,053,932 B2 | 5/2006 | Lin et al. | |
| 7,102,616 B1 | 9/2006 | Sleator | |
| 7,151,561 B2 | 12/2006 | Lin et al. | |
| 7,169,633 B2 | 1/2007 | Huang et al. | |
| 7,173,652 B2 | 2/2007 | Lin et al. | |
| 7,199,350 B2 | 4/2007 | Chien | |
| 7,230,611 B2 | 6/2007 | Bischoff | |
| 7,242,391 B2 | 7/2007 | Lin et al. | |
| 7,274,836 B1 | 9/2007 | Chien | |
| 7,324,088 B2 | 1/2008 | Lin et al. | |
| 7,342,570 B2 | 3/2008 | Lin et al. | |
| 7,355,588 B2 | 4/2008 | Lin et al. | |
| 7,388,997 B2 | 6/2008 | Lin et al. | |
| 7,796,116 B2 | 9/2010 | Salsman | |
| 7,864,159 B2 | 1/2011 | Sweetser | |
| 8,089,455 B1 | 1/2012 | Wieder | |
| 8,441,440 B2 | 5/2013 | Makita | |
| 2001/0002139 A1 * | 5/2001 | Hiraoka | 347/238 |
| 2001/0010514 A1 | 8/2001 | Ishino | |
| 2001/0036082 A1 | 11/2001 | Kanesaka | |
| 2001/0050672 A1 * | 12/2001 | Kobayashi | G06F 3/0304 345/158 |
| 2002/0136010 A1 * | 9/2002 | Luk | 362/250 |
| 2003/0002033 A1 * | 1/2003 | Boman | G01B 11/22 356/139.03 |
| 2003/0038778 A1 | 2/2003 | Noguera | |
| 2004/0066659 A1 * | 4/2004 | Mezei et al. | 362/555 |
| 2004/0207597 A1 | 10/2004 | Marks | |
| 2004/0222969 A1 | 11/2004 | Buchenrieder | |
| 2005/0157515 A1 | 7/2005 | Chen et al. | |
| 2005/0180159 A1 | 8/2005 | Wu et al. | |
| 2005/0276064 A1 | 12/2005 | Wu et al. | |
| 2006/0152488 A1 | 7/2006 | Salsman | |
| 2006/0152489 A1 | 7/2006 | Sweetser | |
| 2006/0264260 A1 * | 11/2006 | Zalewski | A63F 13/06 463/36 |
| 2006/0268565 A1 * | 11/2006 | Chang | 362/540 |
| 2007/0049374 A1 | 3/2007 | Ikeda et al. | |
| 2007/0050597 A1 | 3/2007 | Ikeda | |
| 2007/0052177 A1 | 3/2007 | Ikeda et al. | |
| 2007/0060228 A1 * | 3/2007 | Akasaka | A63F 13/10 463/1 |
| 2007/0060391 A1 | 3/2007 | Ikeda et al. | |
| 2007/0066394 A1 * | 3/2007 | Ikeda et al. | 463/37 |
| 2007/0072680 A1 | 3/2007 | Ikeda | |
| 2007/0236452 A1 * | 10/2007 | Venkatesh | A63F 13/06 345/158 |
| 2008/0015017 A1 | 1/2008 | Ashida et al. | |
| 2008/0030991 A1 * | 2/2008 | Yeh | 362/249 |
| 2008/0039202 A1 | 2/2008 | Sawano et al. | |
| 2008/0174550 A1 * | 7/2008 | Laurila et al. | 345/158 |
| 2009/0005166 A1 | 1/2009 | Sato | |
| 2009/0027335 A1 * | 1/2009 | Ye | G06F 3/017 345/158 |

FOREIGN PATENT DOCUMENTS

| | | |
|---|---|---|
| JP | 6-154422 | 6/1994 |
| JP | 10-99542 | 4/1998 |
| JP | 11-506857 | 6/1999 |
| JP | 2005-040493 | 2/2005 |
| JP | 2005-063230 | 3/2005 |
| WO | 02-17054 | 2/2002 |

OTHER PUBLICATIONS

Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).

Allen, et al., "Tracking: Beyond 15 Minutes of Thought," SIGGRAPH 2001 Course 11 (Course Pack) from Computer Graphics (2001).

Analog Devices "ADXL202E Low-Cost ±2 g Dual-Axis Accelerometer with Duty Cycle Output" (Data Sheet), Rev. A (2000).

Analog Devices "ADXL50 Single Axis Accelerometer" (Data Sheet), http://www.analog.com/en/obsolete/adxl50/products/product.html (Mar. 1996).

Bachmann et al., "Inertial and Magnetic Posture Tracking for Inserting Humans into Networked Virtual Environments," Virtual Reality Software and Technology archive, Proceedings of the ACM Symposium on Virtual Reality Software and Technology, Baniff, Alberta, Canada, pp. 9-16 (2001).

Bachmann, "Inertial and Magnetic Angle Tracking of Limb Segments for Inserting Humans into Synthetic Environments," Dissertation, Naval Postgraduate School, Monterey, CA (Dec. 2000).

Benbasat, "An Inertial Measurement Unit for User Interfaces," Massachusetts Institute of Technology Dissertation, (Sep. 2000).

Bhatnagar, "Position trackers for Head Mounted Display systems: A survey" (Technical Report), University of North Carolina at Chapel Hill (Mar. 1993).

Bishop, "The Self-Tracker: A Smart Optical Sensor on Silicon," Ph.D. Dissertation, Univ. of North Carolina at Chapel Hill (1984).

Bishop, et al., "Grids Progress Meeting" (Slides), University of North Carolina at Chapel Hill, NC (1998).

Bishop, et al., Self-Tracker: Tracking for Hybrid Environments without Infrastructure (1996).

"Celestial Navigation—Wikipedia," http://en.wikipedia.org/wiki/Celestial_navigation, 7 pages. (last edit May 1, 2007).

(56) References Cited

OTHER PUBLICATIONS

Cutts, "A Hybrid Image/Inertial System for Wide-Area Tracking" (Internal to UNC-CH Computer Science) (Jun. 1999).

Duck Hunt, 4 pages (1985).

Eiβele, "Orientation as an additional User Interface in Mixed-Reality Environments," 1. workshop Ervwiterte und Virtuelle Realität, pp. 79-90. GI-Fachgruppe AR/VR (2007).

Ferrin, "Survey of Helmet Tracking Technologies," Proc. SPIE vol. 1456, p. 86-94 (Apr. 1991).

Foxlin, "Generalized architecture for simultaneous localization, auto-calibration, and map-building," IEEE/RSJ Conf. on Intelligent Robots and Systems, Lausanne, Switzerland (Oct. 2002).

Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).

Foxlin, "Motion Tracking Requirements and Technologies," Chapter 7, from Handbook of Virtual Environment Technology, Stanney Kay, Ed. (2002).

Foxlin, et al., "VIS-Tracker: A Wearable Vision-Inertial Self-Tracker," IEEE Computer Society (2003).

Fuchs, "Inertial Head-Tracking," Massachusetts Institute of Technology, Sep. 1993.

Goschy, "Midway Velocity Controller" (youtube video http://www.youtube.com/watch?v=wjLhSrSxFNw) (Sep. 8, 2007).

Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).

Hogue, "Marvin: A Mobile Automatic Realtime Visual and INertial tracking system," Master's Thesis, York University (2003).

Intersense, "InterSense InertialCube2 Manual for Serial Port Model" (2001).

Meyer et al., "A Survey of Position Tracker," vol. 1, Issue 2, pp. 173-200, MIT Presence, (1992).

Mizell, "Using Gravity to Estimate Accelerometer Orientation," IEEE Computer Society (2003).

Pique, "Semantics of Interactive Rotations," Interactive 3D Graphics, Proceedings of the 1986 workshop on Interactive 3D graphics, pp. 259-269 (Oct. 1986).

Selectech, "Airmouse Remote Control System Model AM-1 User's Guide," Colchester, VT (Sep. 24, 1991).

Selectech, "AirMouse Remote Controls, AirMouse Remote Control Warranty" (1991).

Selectech, "Changing Driver Versions on CDTV/AMIGA" (Oct. 17, 1991).

Selectech, "Selectech AirMouse Remote Controls, Model # AM-R1," photographs (1991).

Selectech, Facsimile Transmission from Rossner to Monastiero, Airmouse Remote Controls, Colchester, VT (Mar. 25, 1992).

Selectech, Selectech AirMouse Devices (image) (1991).

Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," AirMouse Remote Control MS-DOS Driver Version: 3.00/3.05, Windows 3.0 Driver Version: 1.00 (1991).

Simon, et al. "The YoYo: A Handheld Combining Elastic and Isotonic Input," http://www.uni-weimar.de/cms/fileadmin/medien/vr/documents/publications/TheYoYo-Interact2003-Talk.pdf (2003).

Spencer, Mark, "A TV Remote Control Decoder," http://www.arrl.org/news/features/2004/03/30/1/, 5 pages (Mar. 30, 2004).

Titterton et al., "Strapdown Inertial Navigation Technology," pp. 1-56 and pp. 292-321 (May 1997).

Ward, et al., "A Demonstrated Optical Tracker With Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).

"Washington Area Model Accessibility Project (Washington Area Map," Talking Signs, Infrared Communications System, Baton Rouge, LA, 7 pages (copyright 2000 Revised May 11, 2006).

Welch et al., Motion Tracking: No Silver Bullet, but a Respectable Arsenal IEEE Computer Graphics and Applications, vol. 22, No. 6, pp. 24-38 (Nov. 2002).

Welch, et al., "The HiBall Tracker: High-Performance Wide-Area Tracking for Virtual and Augmented Environments," ACM SIGGRAPH, Addison-Wesley (1999).

Welch, et al., "The High-Performance Wide-Area Optical Tracking : The HiBall Tracking System," MIT Presence, Presence, vol. 10 , No. 1 (Feb. 2001).

Wilson, "XWand: UI for Intelligent Environments," http://research.microsoft.com/en-us/um/people/awilson/wand/default.htm (Apr. 2004).

Wilson, et al., "Xwand: UI for Intelligent Spaces," CHI 2003, Proceedings of the SIGCHI conference on Human factors in computing systems, pp. 545-552 (Apr. 2003).

Wormell, et al., "Advancements in 3D Interactive Devices for Virtual Environments," ACM International Conference Proceeding Series; vol. 39 (2003).

www.3rdtech.com (2000-2006).

Office Action in corresponding U.S. Appl. No. 11/745,842 dated Jan. 22, 2016.

\* cited by examiner

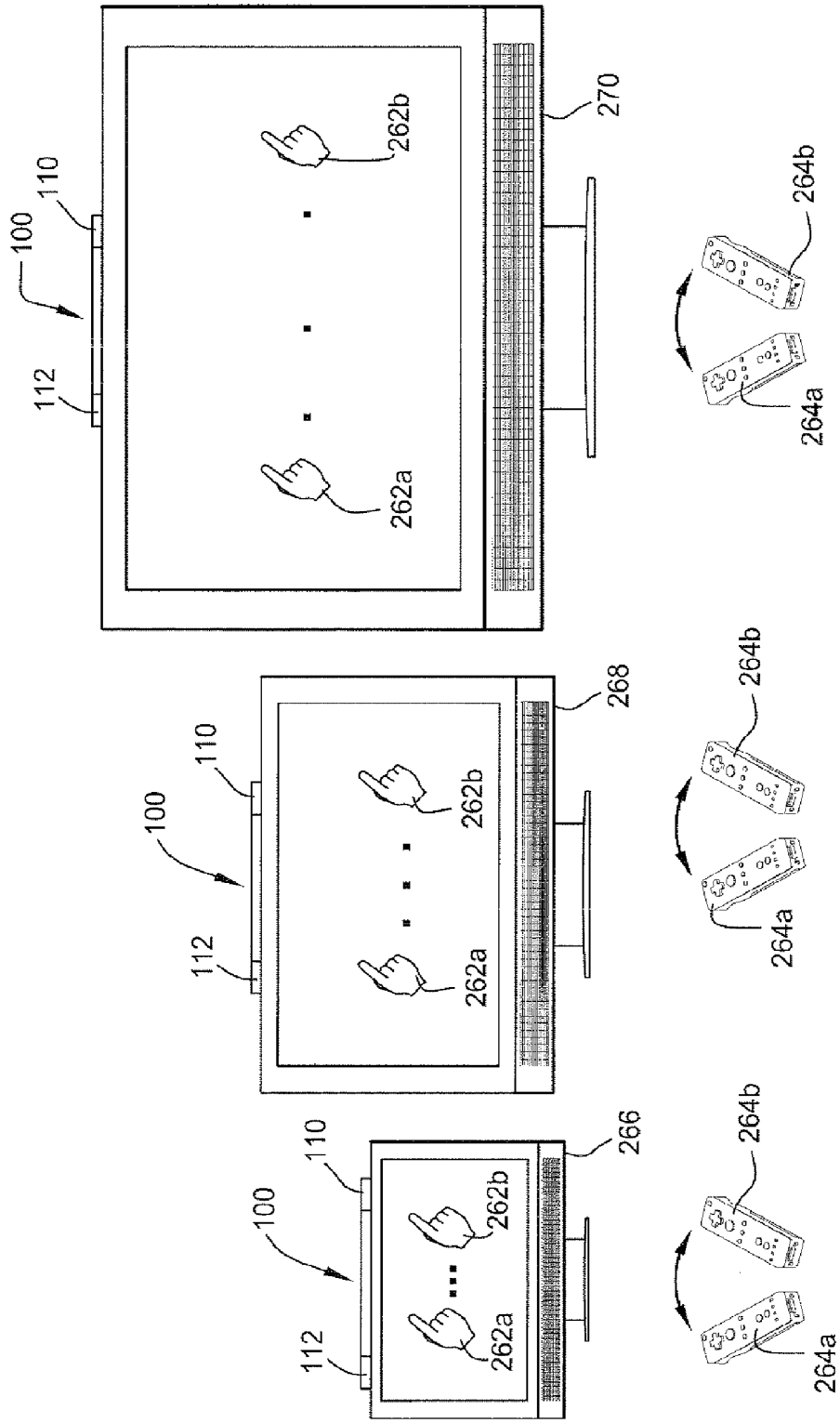

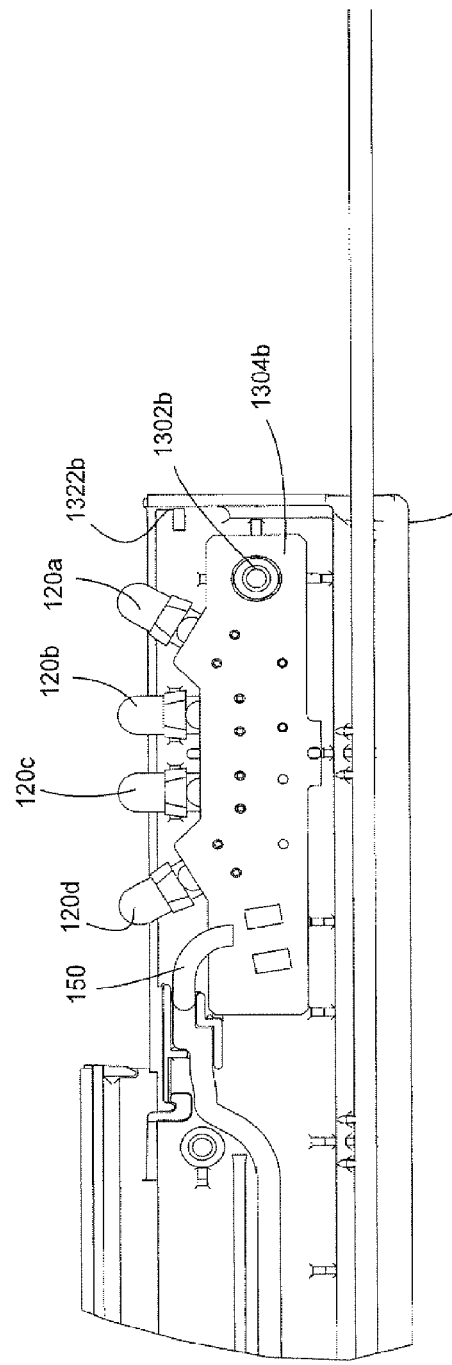
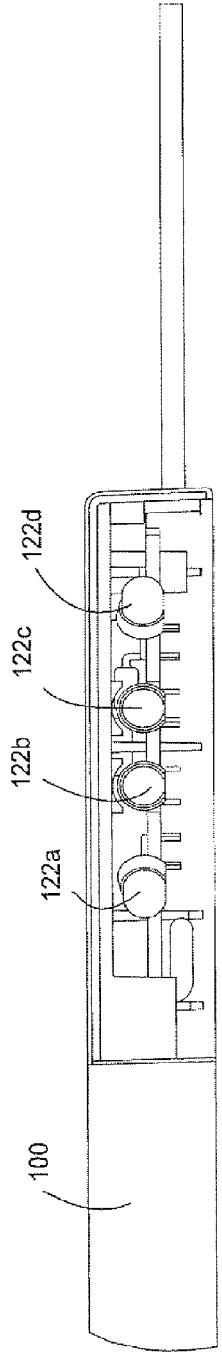

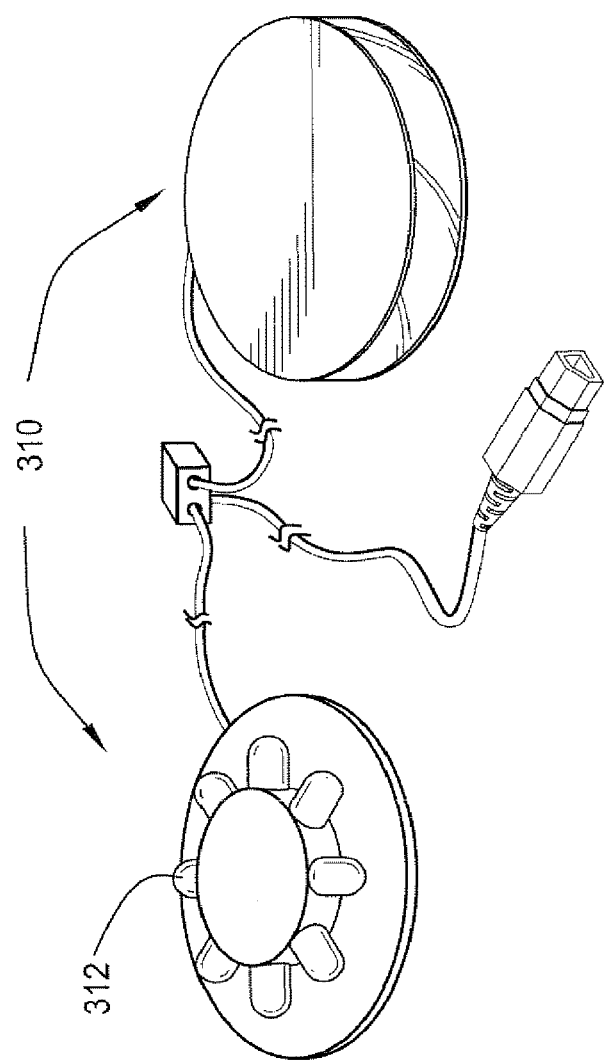

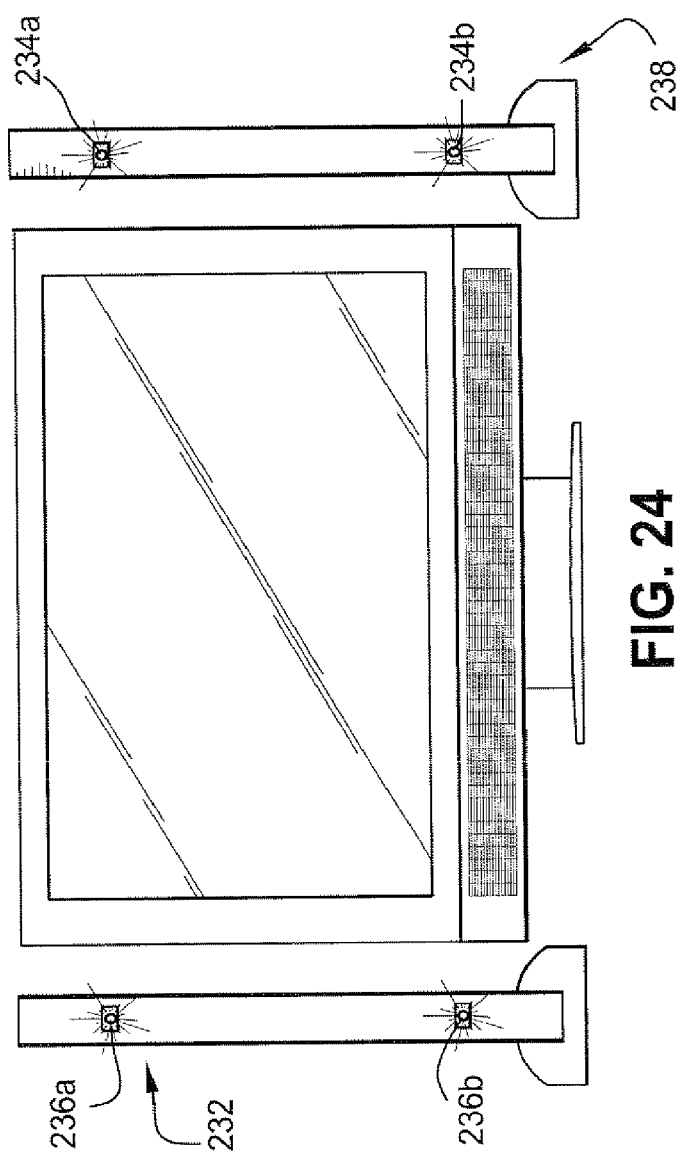

METHODS AND APPARATUS FOR USING ILLUMINATION MARKS FOR SPATIAL POINTING

CROSS-REFERENCES TO RELATED APPLICATIONS

This application is a division of application Ser. No. 11/745,842 filed May 8, 2007, which application claims the benefit of priority from provisional application No. 60/746,769 filed May 8, 2006; and is a continuation-in-part of application Ser. No. 29/268,255 filed Nov. 2, 2006 (723-2039), and also is a continuation-in-part of application Ser. No. 29/268,254 filed Nov. 2, 2006 (723-2045). The entire contents of each of these prior applications is incorporated herein by reference as if expressly set forth.

FIELD

The technology herein relates to direction finding and pointing, and more particularly to pointing and/or targeting techniques, devices and systems. Still more particularly, the technology herein relates to position indicating light-emitting devices, and to video game and other remote control devices that sense such light-emitting devices for use in determining where they are pointing.

BACKGROUND AND SUMMARY

Since ancient times, people have used lights in the sky to find their way. An experienced celestial navigator can find his or her way at night or in the daytime with great accuracy just by noting the positions of the points of light in the heavens above us. Such "celestial navigation" makes use of observed positions of the North star and other stars, the Sun, the Moon and certain planets to ascertain position and direction. Even a young child knows that the Sun rises in the East and sets in the West. By using a sextant or other measuring device, navigators ancient and modern have been able to nearly exactly ascertain their position (e.g., longitude and latitude) on the earth's surface.

Artificial lights can also be used to ascertain heading. For example, a sailor piloting a ship off the coast can estimate the direction and distance to port by observing the lights of cities, towns and lighthouses. Aircraft can ascertain position by observing many light beacons on radio towers or other structures.

In the electronic world, it is possible for a computer-based camera device or other light sensor or detector to automatically ascertain distance relative to man-made light sources by measuring the spacing between detected points of light or other illumination. If the detector "sees" two spaced-apart light sources as being close together, then the detector is relatively far away from the light sources. If the detector detects that the two spaced-apart light sources have "moved" farther apart, then the detector has moved closer to the light sources. Furthermore, just as someone familiar with the summer night sky can tell which direction they are looking simply by observing the orientation of patterns of the star constellations they see, a light detector provided with the appropriate processing capabilities (e.g., software and/or hardware) can determine some aspects of its orientation relative to point light sources based on received light pattern orientation.

Such principles can be used for various applications, including, but not limited to detecting some aspects of the orientation of a handheld or other pointing or control device relative to a variety of target surfaces, such as display surfaces. For example, using such techniques, it is possible to detect how a handheld pointing device is aimed toward a display or other presentation surface. Such a handheld pointing device may be for example as described in US2007/0066394 filed Sep. 15, 2006, incorporated herein by reference.

While many display devices, including, but not limited to, computer, television, graphical and other displays, are capable of generating and emitting light, such light emissions are generally for the purpose of conveying information to human eyes. For example, the electron beam scanning performed by a conventional television display or computer monitor causes display pixels to emit visible light in the form of visible images. Some in the past have used these same displays to generate machine-recognizable light targets (e.g., so-called "flying spot scanners"). In addition, some display light detection techniques have been commercially successful. For example, a so-called "light gun" was used with early Nintendo video games such as "Duck Hunt" to determine where on a display screen the user was aiming a simulated weapon. However, further improvements and additional techniques as possible and desirable.

The technology herein provides exemplary illustrative non-limiting systems, methods, devices and techniques for supplying convenient and effective targeting or "marking" light sources for use with presentation surfaces including but not limited to 2D and 3D video display systems. Useful non-limiting applications include electronic and non-electronic displays of all types such as televisions, computer monitors, light projection systems, whiteboards, blackboards, easels and any other presentation or other surface imaginable. Such targeting or marking can be used for example to control cursors, other symbols, or objects on electronic displays.

An exemplary illustrative non-limiting implementation provides an elongated member such as a bar shaped housing including spaced-apart point light sources. The point sources could be disposed within a housing of any shape, could be in separate housings, could be included in the display's housing, etc. In one exemplary illustrative non-limiting implementation, the elongated member may have first and second ends. A point source may be disposed on each end or anywhere else along the housing. In one exemplary illustrative non-limiting implementation, the spacing between the two spaced-apart point sources may be 20 centimeters or more. The point sources could be closer together or further apart.

In an exemplary illustrative non-limiting implementation, each point source comprises an array of plural point illumination sources. The plural point illumination sources in each array may be directional. The point sources may be aimed in different directions to provide different illumination patterns. For example, some (e.g., three) of the point sources can have a primary radiation directionality (lobes) that is substantially perpendicular to a front face of the bar-like structure, whereas other point sources can have primary radiation directionalities (lobes) that define acute angles with respect to such perpendicular direction. In one exemplary illustrative non-limiting implementation, some of the point sources are directed forward, while others are directed outwardly, and still others are directed inwardly with respect to the elongated member. Such expanded irradiation coverage area can provide advantages for multi-player games or the like where two or more spaced-apart detection devices each independently detect the point sources from different positions.

In one exemplary illustrative non-limiting implementation, the point sources can be generally oriented to emit light within a common horizontal plane or into different planes (e.g., some upwardly, some downwardly, etc.). Such 3D directionality can provide a potentially wider coverage area horizontally and/or vertically. The point sources could use a single point source in each array. The point source arrays could be oriented in varying directions or in the same direction.

In an exemplary non-limiting implementation of arrays with a plurality of point sources, the point sources in each array may emit the same or different light colors or frequencies of light. For example, one exemplary illustrative non-limiting implementation may provide, on each end of a rigid "marker bar" or other structure, an array of differently-aimed infrared point light sources, with the different point light sources emitting the same frequencies or wavelengths of infrared or other light. Other arrangements are possible.

In an exemplary illustrative non-limiting implementation, the elongated member may comprise a rigid bar or other structure that is especially adapted for mounting to the top, bottom, side or other dimension of an electronic display device such as a television set. Such light emitting bar structure can be mounted by a variety of convenient means including but not limited to adhesive tape, Velcro, gravity, interlocking parts, or any other desired mechanism. The device could also be affixed to a stand on which the display sits or to which the display is attached. Still other arrangements could provide structures that are integral or partially integral to display devices.

Additional aspects of exemplary illustrative non-limiting implementations include:

At least two discrete infrared ray emitting portions united by a rigid or semi-rigid connecting rod or other structure to provide easy handling and known spacing.

Point sources comprising plural light emitting diodes (LEDs) or other emitters having different primary irradiation directions—thereby expanding the infrared irradiation coverage area and potentially improving detection accuracy.

Exemplary spacing between infrared ray emitting portions greater than 20 centimeters or other desired spacing in one exemplary illustrative non-limiting implementation.

In one exemplary illustrative non-limiting implementation, a straight line connects the bright points of a number of LEDs in the infrared ray emitting portion in parallel with a long side of the bar or other structure to provide symmetry (i.e. the distances between the bright point of each LED and the long side of the bar are the same).

Infrared ray emitting portions located on opposite ends of a bar or other elongated structure, or spaced apart equally along the length of a bar or other structure.

Other exemplary illustrative non-limiting configurations provide plural infrared or other ray emitting portions connected by flexible filaments such as cords or any other connecting mechanisms.

Fixed or adjustable spacing between plural light sources. For example, a bar of adjustable length makes it possible to change the distance between two infrared ray emitting portions after manufacture (e.g., by users at time of installation).

You can place the Marker bar either above or below the TV screen.

Using a marker bar stand: Communication may be improved in some situations by mounting the Marker bar on the Marker bar stand. (For example: if the TV is sitting on the floor.) To do this, remove the protective film from the foam pads on the bottom of the Marker bar stand. For additional stability, you can add adhesive-backed foam tape from a supplied sheet. These can be supplied to both the top and bottom of the stand. If you are using the extra foam tape, remove the protective film from the piece on the top of the Marker bar stand. One can mount the Marker bar stand to the front edge of the surface the TV is sitting on, or to the top of the TV.

To ensure the best game play experience, it may be desirable to ensure that the front of the Marker bar is aligned close to the front of the TV with the center of the Marker bar aligned with the center of the TV. Reception may be improved by mounting the Marker bar to the top of the TV with a Marker bar Stand.

BRIEF DESCRIPTION OF THE DRAWINGS

These and other non-limiting illustrative exemplary aspects will be better and more completely understood by referring to the following description of exemplary illustrative non-limiting implementations in conjunction with the drawings, of which:

FIGS. 9A-9C illustrate how the FIG. 1 device can be used with differently sized display devices;

FIG. 17D shows a detailed elevated to plan view of an exemplary light source array;

FIG. 17E shows a front elevated view of the FIG. 17D light source array;

FIG. 22 shows an exemplary illustrative non-limiting omnidirectional point source arrangement;

FIG. 24 shows an exemplary illustrative non-limiting vertically oriented array arrangement.

DETAILED DESCRIPTION

Figure 1:
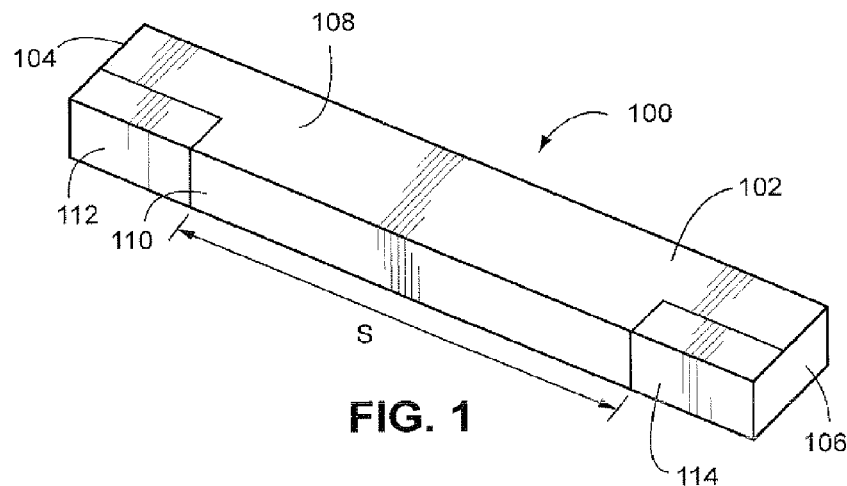
FIG. 1 is an elevated side perspective view of an exemplary illustrative non-limiting display surface targeting or marking device.

FIG. 1 is a side elevated perspective view of an exemplary illustrative non-limiting implementation of a targeting or marking device 100. In the example shown, targeting or marking device 100 comprises an elongated bar-shaped housing 102 having a first end 104 and a second end 106. The housing 102 can be made of rigid plastic or any other rugged, relatively non-breakable material in the exemplary illustrative non-limiting implementation. In the example shown, a top flat surface 108 of housing 102 has a greater dimension than a side flat surface 110, and the overall shape of the housing is rectangular in cross-section. However, other sizes, shapes and dimensions (e.g., cylindrical, square, etc.) are also possible. Furthermore, other, semi-rigid or non-rigid flexible configurations might be used if desired.

The FIG. 1 exemplary illustrative non-limiting implementation includes first and second light emitting ports 112, 114. In one exemplary illustrative non-limiting implementation, light emitting ports 112, 114 are disposed at or near the opposite ends 104, 106 of housing 102. Thus, light emitting port 112 may be disposed at or near housing end 104, and light emitting port 114 may be disposed at or near housing end 106. In one exemplary illustrative non-limiting implementation, a predetermined minimum spacing S is provided between ports 112, 114. S may be greater than or equal to 20 centimeters in one exemplary illustrative non-limiting implementation.

Housing 102 shown in FIG. 1 may be of plastic or other molded construction with fixed dimensionality in one exemplary illustrative non-limiting implementation. Other example implementations can provide adjustable dimensions through slidable engagement between different portions or pieces.

Figure 2:
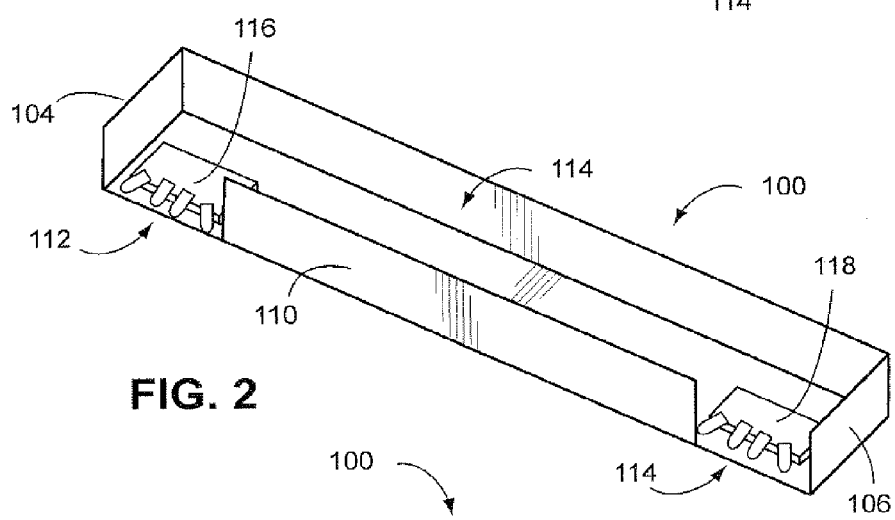
FIG. 2 is a cutaway elevated side perspective view of the FIG. 1 targeting or marking device.

FIG. 2 shows a cutaway view of the FIG. 1 housing 102. In the FIG. 2 example, a top housing portion 108 and front IR lenses have been removed to reveal an inner hollow cavity containing printed circuit boards 116, 118. Printed circuit board 116 and components thereon is used to generate illumination for emission through port 112, and printed circuit board 118 and components thereon is used to generate illumination for emission through port 114. Printed circuit boards 116, 118 may each comprise a conventional etched or other copper-clad fiberglass, epoxy resin or other printed circuit board of conventional design. Other component mounting structures are also possible. In some exemplary illustrative non-limiting implementations, printed circuit boards 116, 118 may be identical, interchangeable assemblies. In other exemplary illustrative non-limiting implementations, printed circuit boards may be non-identical assemblies.

In the example shown, printed circuit boards 116, 118 each have light emitting components mounted thereon. For example, printed circuit board 116 is shown with four light emitting diodes 120a, 120b, 120c, 120d mounted thereon. Similarly, printed circuit board 118 is shown with four light emitting diodes 122a, 122b, 122c, 122d mounted thereon. In another exemplary illustrative non-limiting implementation, each of printed circuit boards 116, 118 may be provided with five (5) light emitting diodes to provide adequate on-axis intensity to extend on-axis range while also providing some off-axis coverage as well. More or fewer light emitting diodes can be used in other exemplary illustrative non-limiting implementations. The light emitting diodes can emit infrared radiation at for example 940 nm.

One advantage of targeting or marking device 100 emitting infrared light is that such emitted infrared (IR) light will generally not be interfered with by visible light including the light emitted by conventional television and computer cathode ray tubes, plasma type displays, liquid crystal displays and other illuminated human readable displays. On the other hand, care may need to be taken to ensure that heat sources (e.g., fireplaces, candles, heat lamps, sunlight streaming in a nearby window, etc.) do not interfere. Usually, users locate their televisions or other display devices away from such heat sources and interference may not be a concern. In addition, a remote portable sensing device designed to sense the infrared light emitted by marking device 100 can be programmed to have adjustable or fixed sensitivity that will allow the sensing device to sense the light emitted by marking device 100 without suffering from undue interference due to ambient heat sources.

Other implementations can use other light generation and/or emission mechanisms for generating and/or emitting light at any frequency including but not limiting to lasing, incandescence, chemoluminescence, bioluminescence, fluorescence, radioactive decay, gas discharge, phosphorescence, scintillation, sonoluminescence, triboluminescence, or any other mechanism for generating and/or emitting radiation at any detectable frequency. Furthermore, other exemplary illustrative non-limiting implementations could use fewer light sources and provide additional or different mechanism(s) for spreading, aiming and/or concentrating light or otherwise developing light emission patterns, such mechanisms including lenses, mirrors or any other optics.

Figure 3:
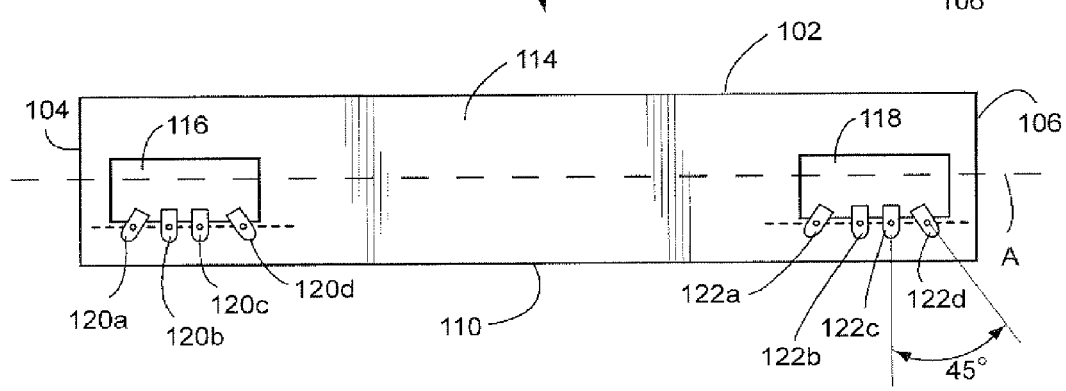
FIG. 3 is a top plan cutaway view of the FIG. 1 targeting or marking device.

As shown in FIG. 3, the exemplary illustrative non-limiting implementation provides, for each printed circuit board 112, 114, four or five light emitting diodes or other point light sources arranged to be aimed in different directions. In the particular example shown, sources 120b, 120c, 122b, 122c are each directed substantially perpendicularly to the longitudinal axis A of housing 102. In this exemplary illustrative non-limiting implementation, sources 120a, 122d are outwardly directed toward respective housing ends 104, 106—forming an angle of approximately 45 degrees from perpendicular, Similarly, sources 120d, 112a are inwardly directed (away from respective housing ends 104, 106)—forming angles of approximately 45 degrees from perpendicular. Different angular offsets may be provided as desired.

The exemplary illustrative non-limiting implementation's use of plural light sources aimed in different directions provides a wider illumination coverage area or radiation pattern. This allows sensing devices that are substantially "off axis" with respect to a direction perpendicular to housing surface 110 to nevertheless detect the positions of ports 112, 114. This can be advantageous for example in multiplayer situations in which several (e.g., two, three or four) different players are positioned in front of the same marking device 100 and associated display device to participate in the same activity such as playing a video game. With this many participants, especially in active games in which participants may need room to move around, at least some of the participants may be located substantially off axis with respect to the central aiming direction of the marking device 100. As will be explained in more detail below, the exemplary positioning of some LEDs 120 to aim directly forward while also providing additional LEDs 102a, 120d, 122a, 122d aiming off axis provided both adequate on-axis detection (even for larger rooms) and adequate off-axis detection (especially since off-axis players are not likely to be located very far away from the display so as to see the off-axis display better).

Figure 4:
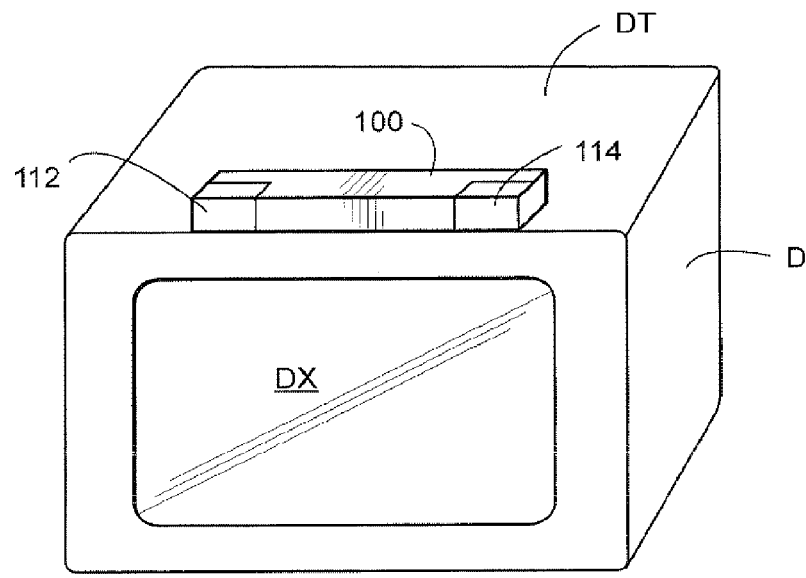
FIGS. 4 and 5 show two different exemplary illustrative non-limiting mounting arrangements.
Figure 5:
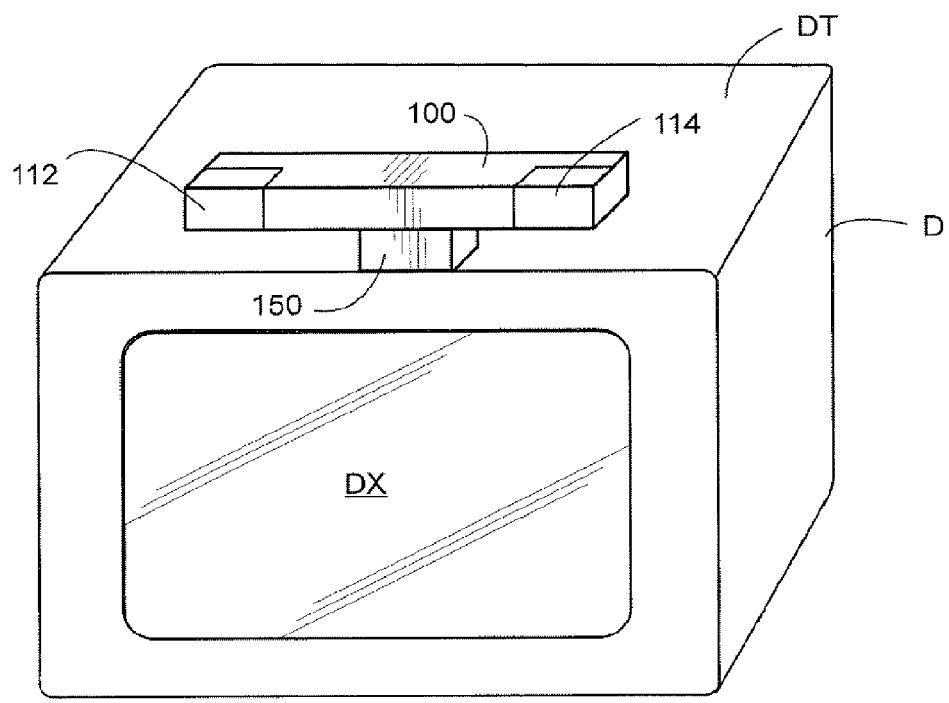

FIGS. 4 and 5 show two exemplary illustrative non-limiting arrangements for mounting targeting or marking device 100 to a display device D such as a television set or other 2D display. Display device D is capable of displaying symbols and objects such as 2D or 3D computer generated graphics. The positions of such symbols or objects can be determined at least in part by handheld devices (not shown) aimed at targeting or marking device 100.

For example, FIG. 4 shows targeting or marking device 100 disposed directly on a top surface DT of display device D. Such mounting can be accomplished for example by gravity, adhesive, Velcro, or any other convenient method or technique. In this example, illumination ports 112, 114 face outwardly in the same direction as display Dx, but other mounting arrangements are also possible. In the FIG. 5 example, targeting or marking device 100 is mounted to display top surface DT using a stand or spacer 150. Use of a stand or spacer 150 may provide more illumination in a downward direction to accommodate users sitting on the floor beneath an elevated display device D (e.g., children playing video games in front of a television housed in a home entertainment center).

Figure 6:
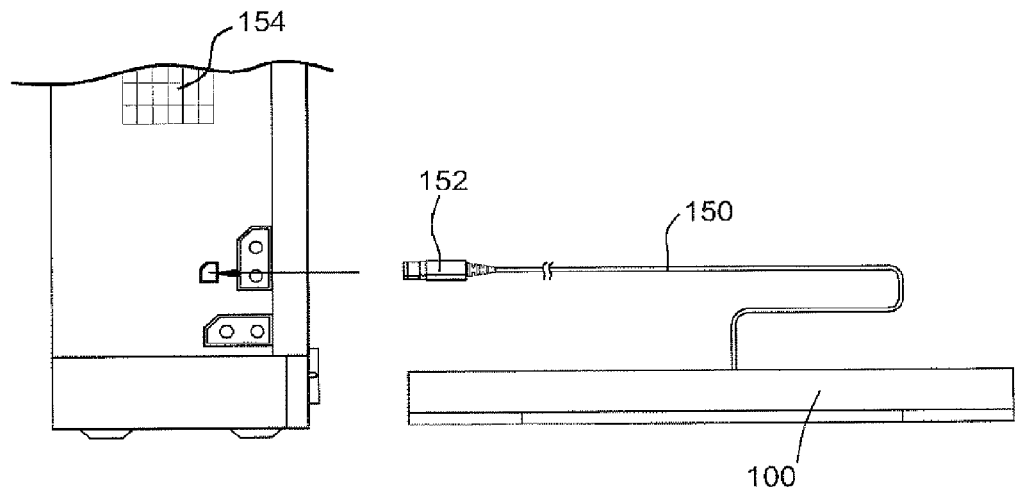
FIG. 6 shows an exemplary technique for connecting the FIG. 1 device to another system such as a video game system.

FIG. 6 shows an example technique for connecting marker device 100 to a main unit 154 such as a video game main unit. In this particular exemplary illustrative non-limiting technique, the main unit 154 supplies the marker bar 100 with power via a power cable 150 which is wired directly into the marker bar 100 without use of any connector. In one exemplary, illustrative non-limiting implementation, power cable 150 may be dimensioned to have a length that is adequate to allow the main unit 154 to be located at a convenient place relative to a display device onto which marker bar 100 is mounted or otherwise positioned. One example length for power cable 150 is approximately 3.4 meters (just over 11 feet long). This length is good for providing adequate distance between the marker device 100 and main unit 154 without providing too much slack cable. This length is exemplary only—other lengths are possible. In other implementations, marker bar 100 could be battery powered or otherwise self-powered so that no power connection is required.

Figure 7:
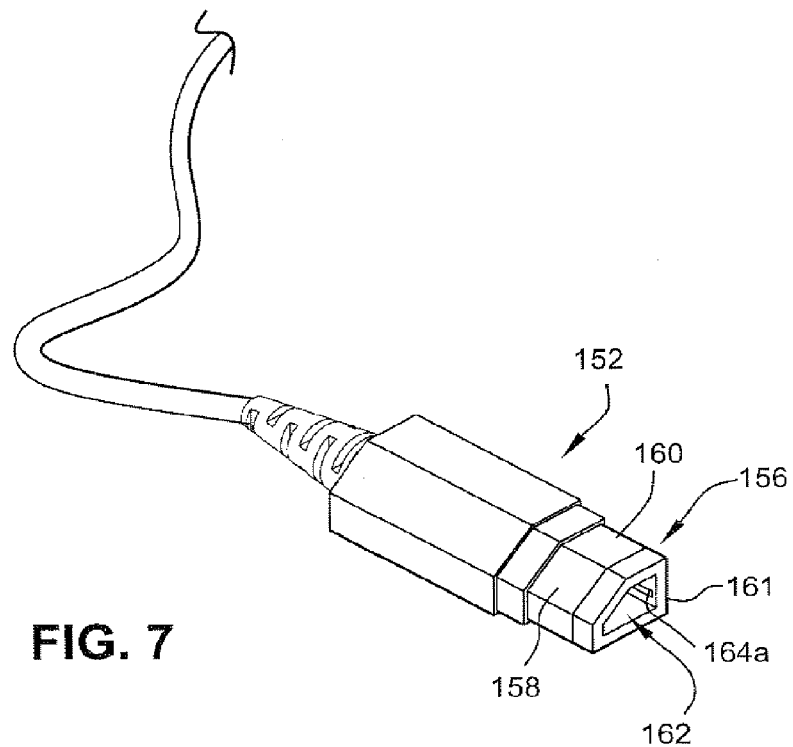
FIG. 7 shows an exemplary illustrative non-limiting connector for use in connecting the FIG. 1 device to another system.

FIG. 7 shows an exemplary configuration for a connector 152 used to connect marker bar 100 cable 150 to main unit 154. In the example shown, connector 152 provides an insertion portion which is rectangular in cross-section except for an angled corner 158. A metallic ground connector 160 may be provided terminating in a plastic or other insulating portion 160. The insulating portion may be hollow, providing a cavity 162 therein having two electrical strip contacts 164a (shown), 164b (not shown—hidden in this view) therein. When connector insertion portion 158 is inserted into and mated with a corresponding female connector on main unit 154, electrical contact is made with contacts 164a, 164b for supplying power (low voltage, low current) to marker device 100.

Figure 8A:
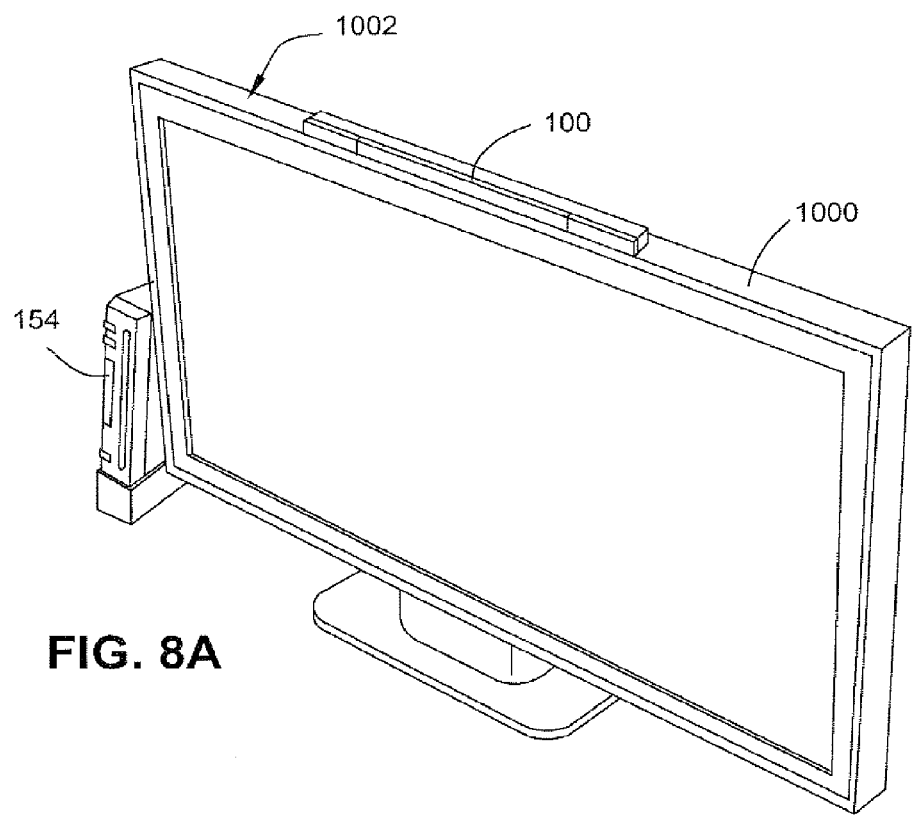
FIGS. 8A-8C illustrate non-limiting ways to mount or otherwise dispose the FIG. 1 device to the top of a display device.
Figure 8B:
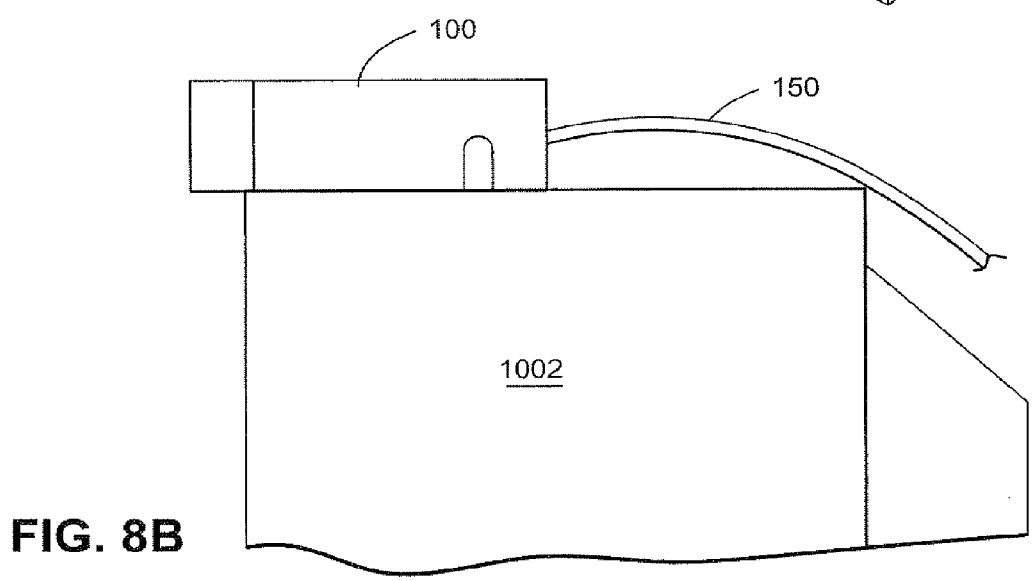
Figure 8C:
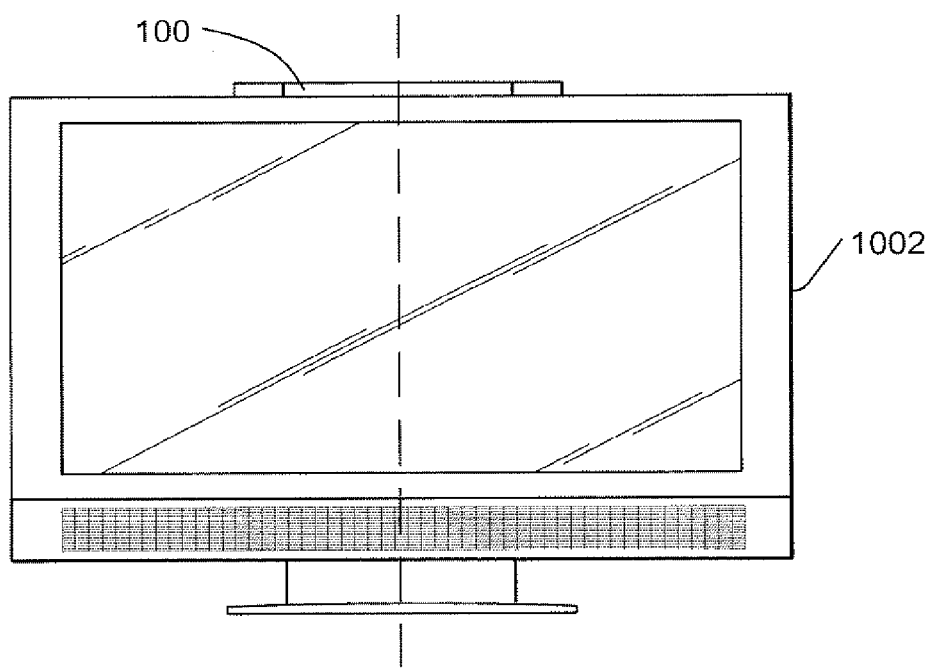

FIG. 8A shows an exemplary technique for mounting marker device 100 to an upper (horizontal) surface 1000 of a conventional display device such as a flat screen television set 1002. In one exemplary illustrative non-limiting implementation, to ensure the best game playing experience, the front of the marker bar 100 should be aligned close to the front of the display device (see FIG. 8B) to allow light to be radiated downward (e.g., toward children playing a game while sitting on the floor), and the center of the device 100 should be aligned with the center of the display device 1002 (see FIG. 8C). FIGS. 9A-9C show how marker device 100 can be used with differently sized display devices (smaller-sized device 266, medium-sized device 268, and larger-sized device 270).

This exemplary implementation allows the same, fixed length marker bar 100 to function for all sized displays, since the marker is marking positions in space, not display edges. Marker bars 100 which are variable in size and designed to mark the display edges as well as positions in space can also be used, but in one exemplary illustrative non-limiting implementation, there are advantages in terms of manufacturing and product marketization to provide a "one size fits all" marker bar 100 that does not need to be customized, modified or special ordered for differently sized display devices. As anyone who has ever shopped for a television or computer display knows, there is a wide range of differently sized displays from sub compact (e.g., 9 inches) to massive (e.g., 54 inches or more). The exemplary illustrative non-limiting marker bar 100 can be used with any such displays.

There is therefore no need in the exemplary illustrative non-limiting implementation for the position of marker bar 100 to be aligned with the edges or extents of the corresponding display device. FIGS. 9A-9C show how plural remote control devices 264 can be used to detect light emitted by marker bar 100 and use such detected light to control a cursor or other object (e.g., game play) displayed on the display device. According to this exemplary implementation, the length of marking device 100 does not need to vary with the size of the TV. The point sources 110, 112 provide optically-detectable markers when the detecting device is in position 264a. When the detecting device is moved to position 264b, the light sources are seen at new positions with respect to the detecting device's camera or other detection mechanism. A corresponding software application may calculate the appropriate cursor position change from position 262a to 262b. Even though TV 266 is smaller than TV 268, which is smaller than TV 270, in this exemplary non-limiting illustrative embodiment, the movement of the cursor relative to the screen size can be the same. That is, position 262a is near the left screen edge on all three TVs, and position 264b is near the right screen edge on all three TVs, even though the detector moved the same amount in all three instances. Because for most of us the pointing operation is relative rather than absolute, the user generally is not aware that he or she is not actually pointing at precise locations on the display corresponding to object or character display position. Rather, the feedback provided by an interactive display allows users to use a relative pointing motion to point over more or less than the area corresponding to the display, and nevertheless accurately control and coordinate the position of objects on the display using such pointing operations.

Figure 10A:
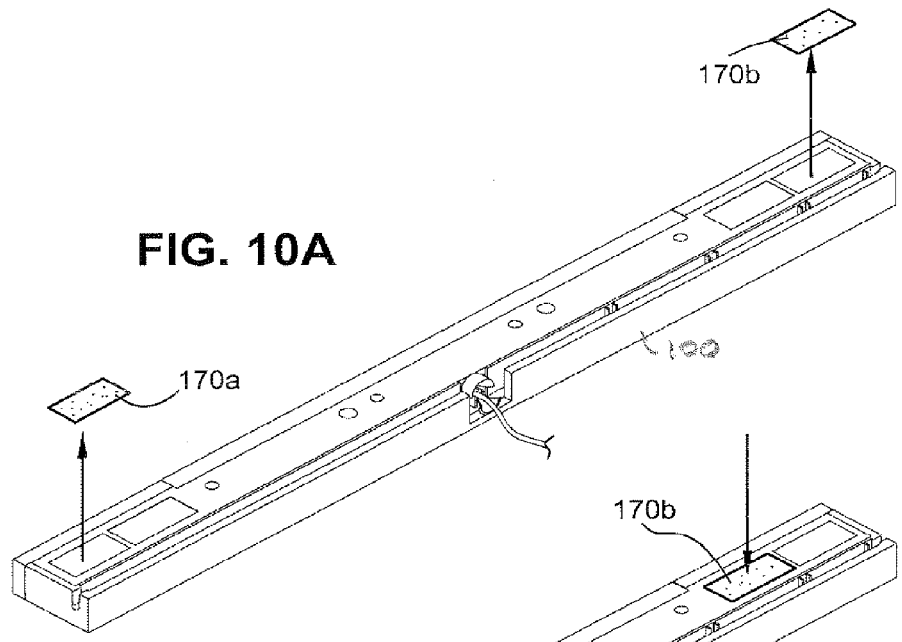
FIGS. 10A-10C show an exemplary illustrative non-limiting technique for adhering the FIG. 1 device to an upper surface of a display device.
Figure 10B:
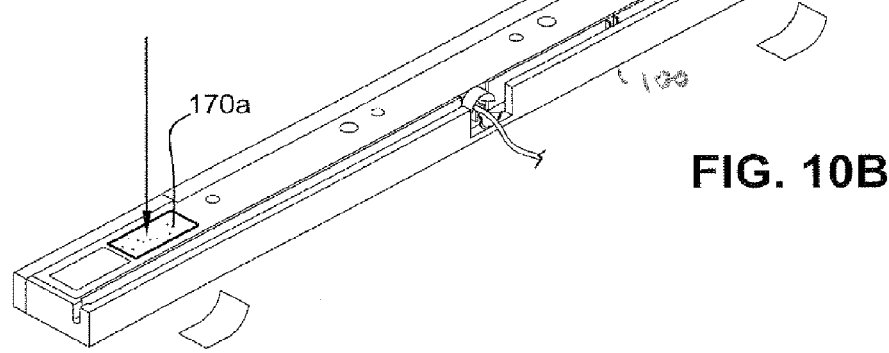
Figure 10C:
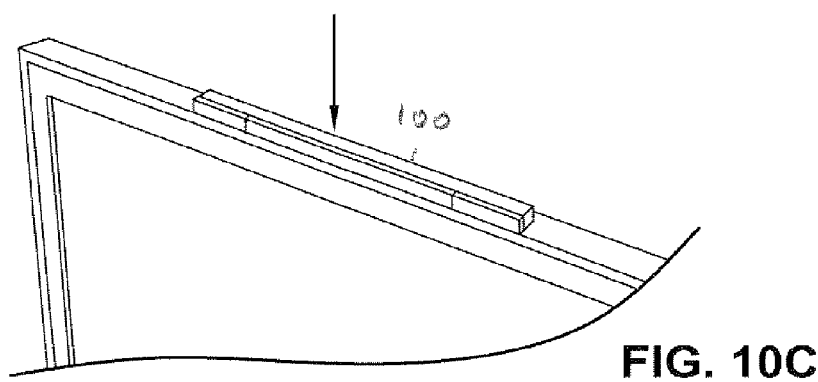

FIGS. 10A-10O show exemplary techniques for adhering marker bar 100 to the top of a display device if desired. For additional stability, it is possible to use adhesive-backed tape 170 or other adhesive to mount the marker bar 100 to an upper display surface.

Figure 11A:
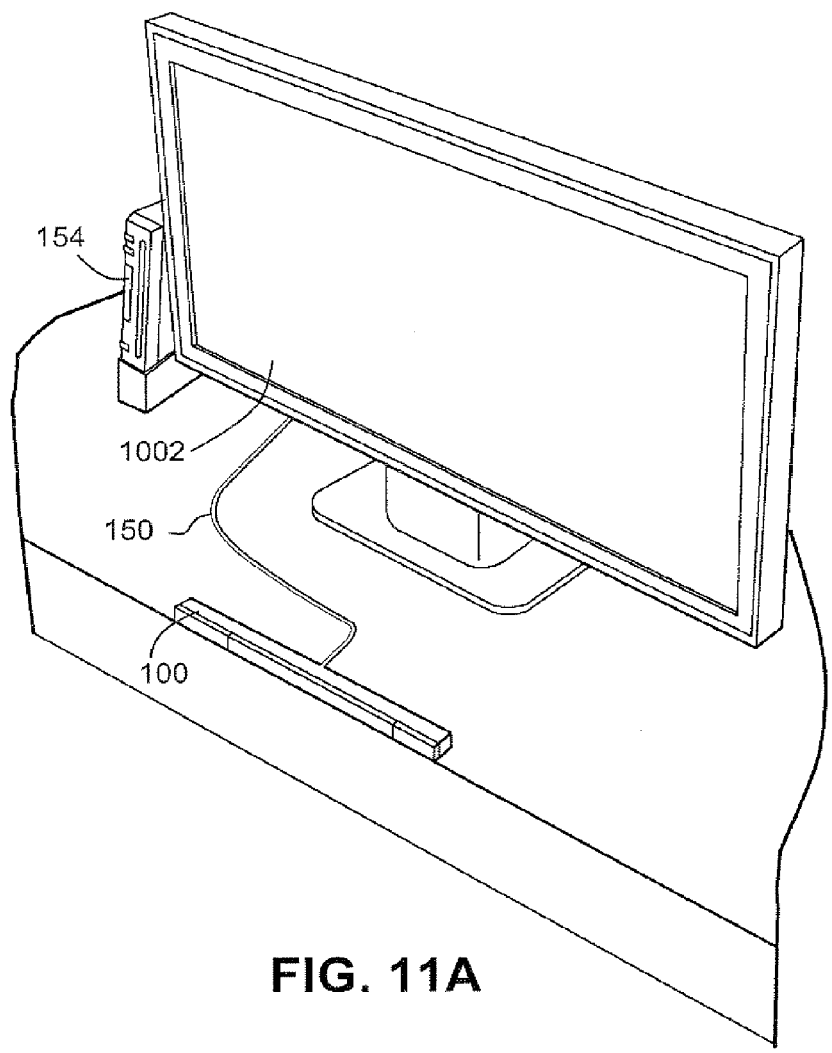
FIGS. 11A-11B show an exemplary illustrative non-limiting technique for mounting or otherwise disposing the FIG. 1 device to a lower surface associated with a display device.
Figure 11B:
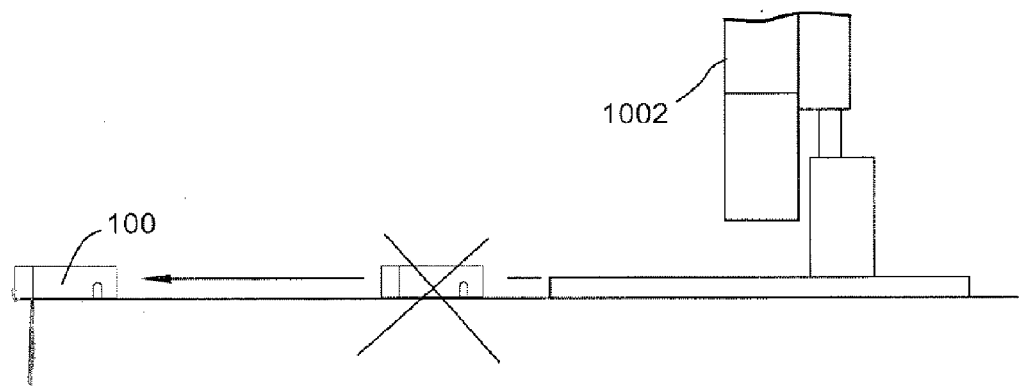
Figure 12A:
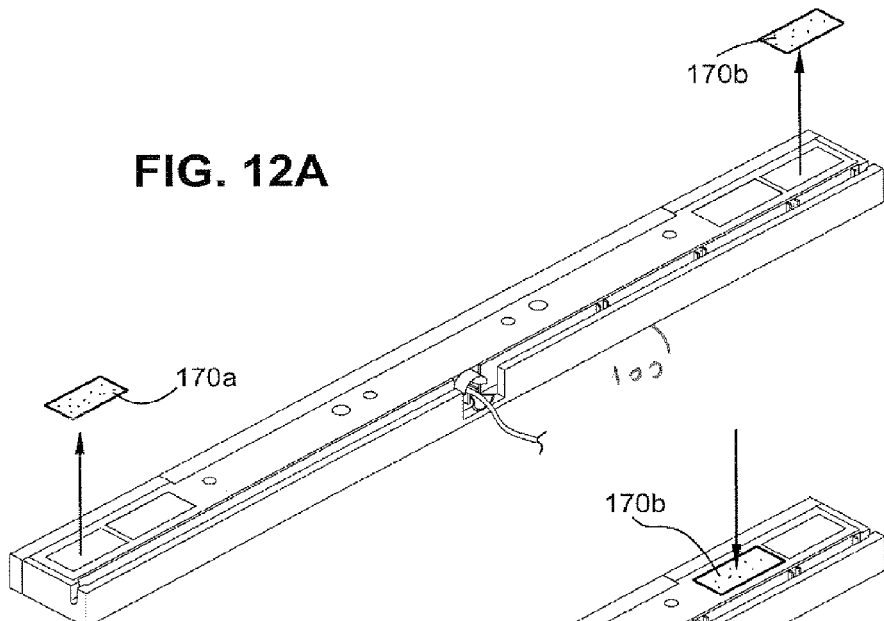
FIGS. 12A-12C show an exemplary illustrative non-limiting technique for adhering the FIG. 1 device to a lower surface associated with a display device.
Figure 12B:
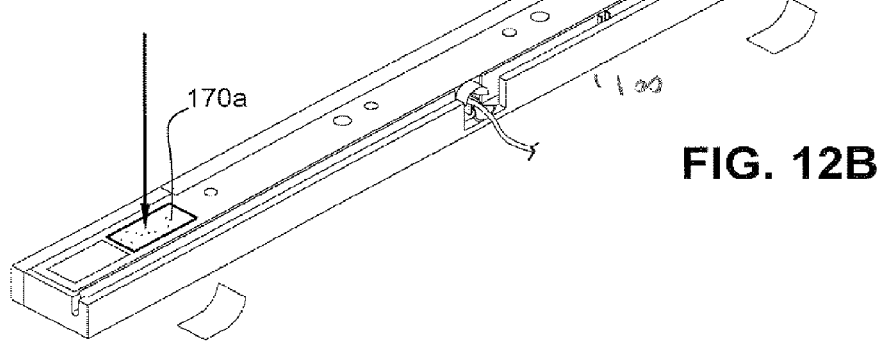
Figure 12C:
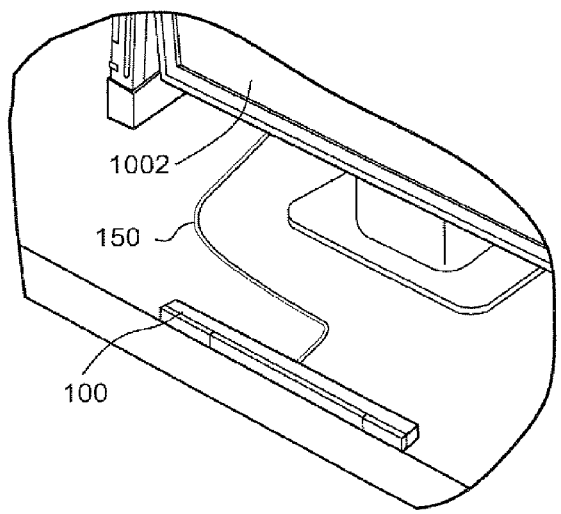

FIGS. 11A-11B show an exemplary alternative mounting arrangement for marker bar 100 below a display device 1002. Sometimes, a display device 1002 is disposed on a table or other surface and it may be more convenient to place marker bar 100 below the display as shown in FIG. 11A. In such an exemplary illustrative non-limiting configuration, it is best to mount the marker bar 100 to the front edge of the surface that the display is sitting on. It is best not to place the marker bar 100 below the surface that the display device is sitting on (e.g., on a shelf below the display device). The center of the marker bar 100 should preferably be aligned with the center of the display device, and the front of the marker bar 100 should be aligned of the front of the surface that the display device is sitting on. See FIG. 11B. As shown in FIGS. 12A-12C, adhesive tape or another mechanism can provide additional stability for mounting marker bar 100 below the display device.

Figure 13A:
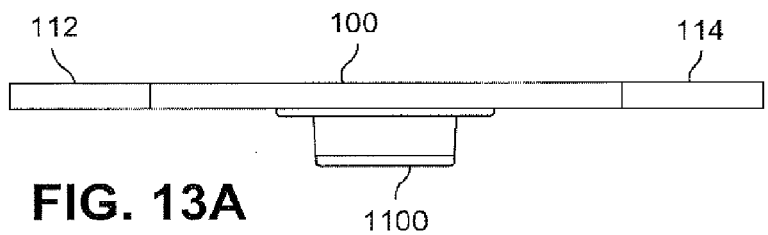
FIGS. 13A-13C show exemplary illustrative non-limiting techniques for mounting the FIG. 1 device to and/or using a stand.
Figure 13B:
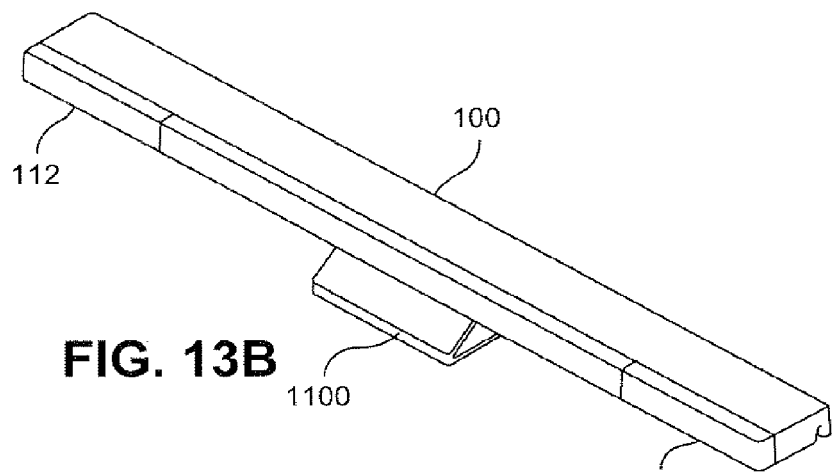
Figure 13C:
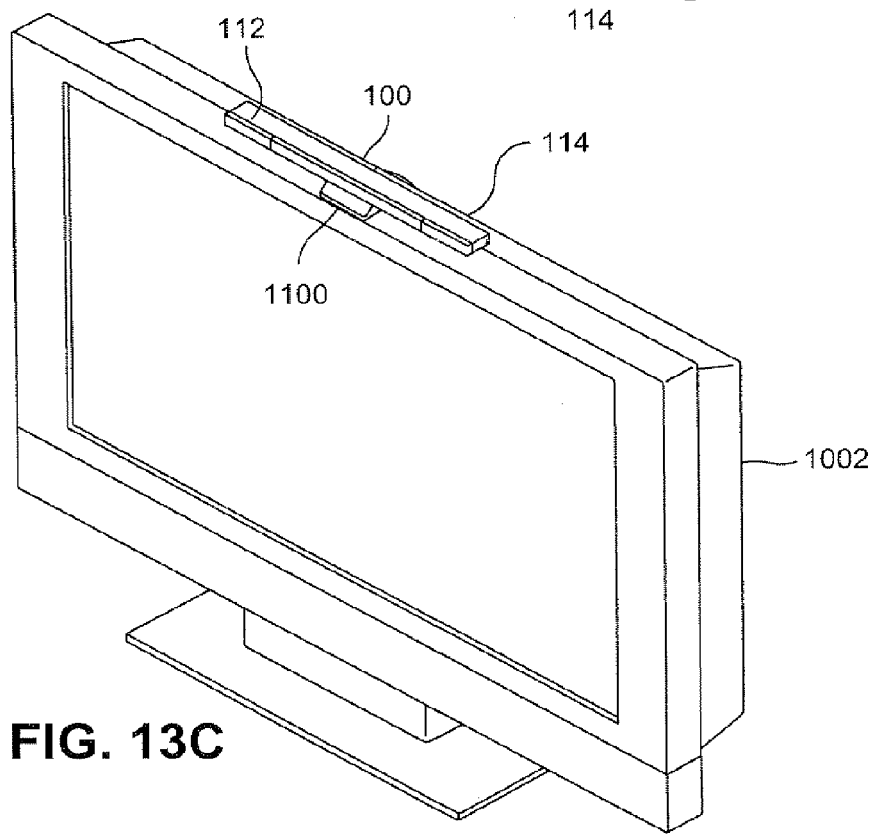

FIGS. 13A-13C show an exemplary further mounting implementation using a stand 1100 that can be used to suspend marker bar 100 above the level of a mounting surface. Stand 1100 may comprise an angled or wedge shaped piece of plastic that suspends marker bar 100 about a surface and retains it in a substantially horizontal position. Such a stand can be useful for example if the display device is sitting on the floor.

Figure 14A:
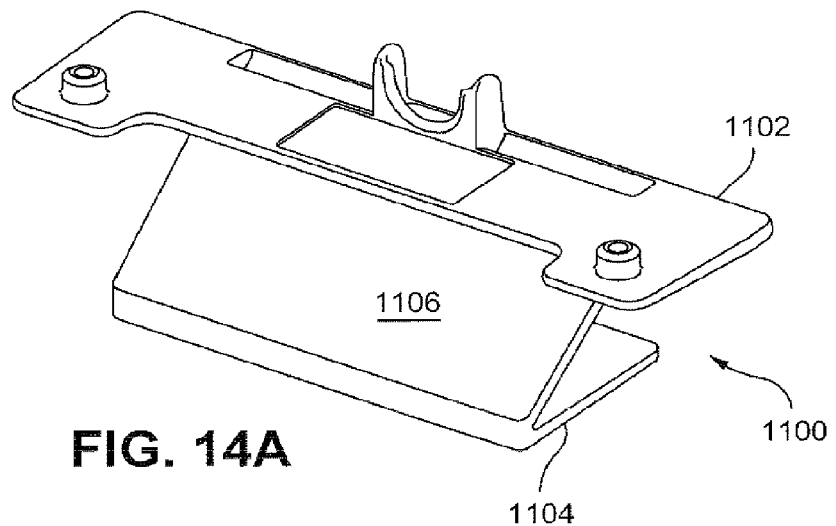
FIGS. 14A-14C show an additional illustrative non-limiting mounting stand.
Figure 14B:
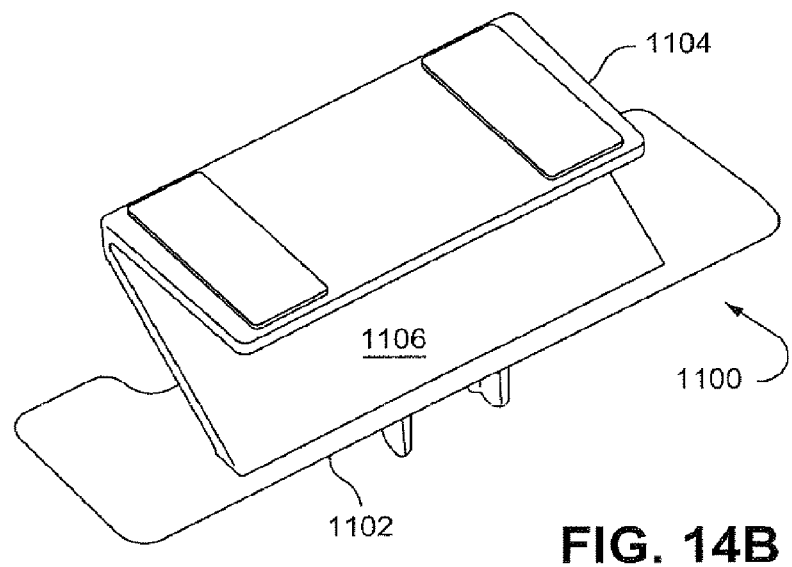
Figure 14C:
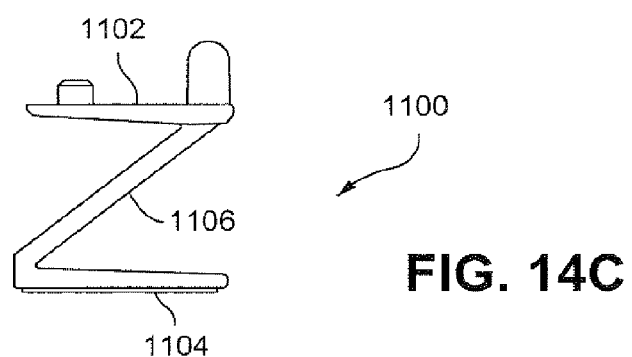
Figure 15A:
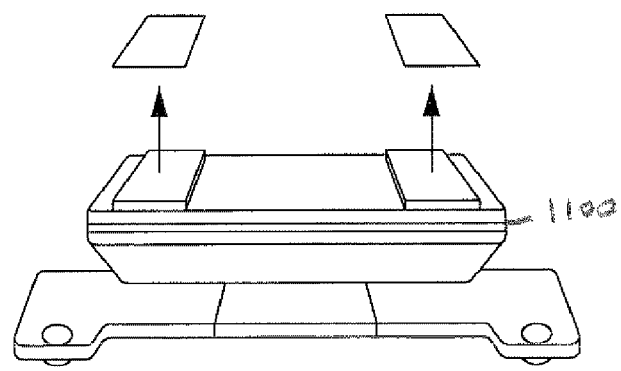
FIGS. 15A-15C show an exemplary illustrative non-limiting technique for adhering the FIG. 1 device to the stand shown in FIGS. 14A-14C.
Figure 15B:
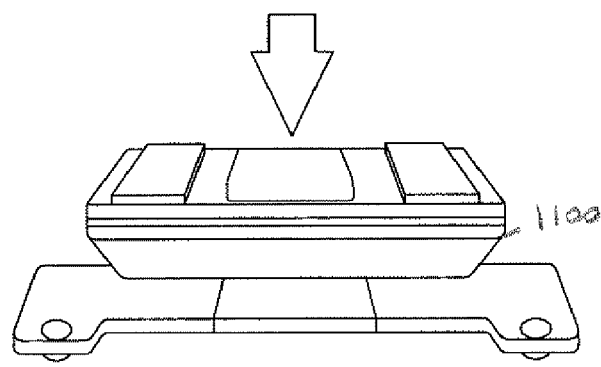
Figure 15C:
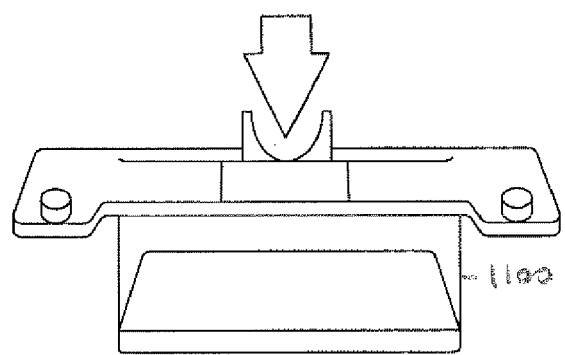

FIGS. 14A-14C shows more detailed views of exemplary stand 1100 providing a marker bar mounting member 1102, a lower support member 1104, and an angled member 1106 connecting the two members. FIGS. 15A-15C show how the FIG. 14A-14C stand can be used with adhesive tape to mount marker bar 100 in a secure and stable fashion.

Figure 15D:
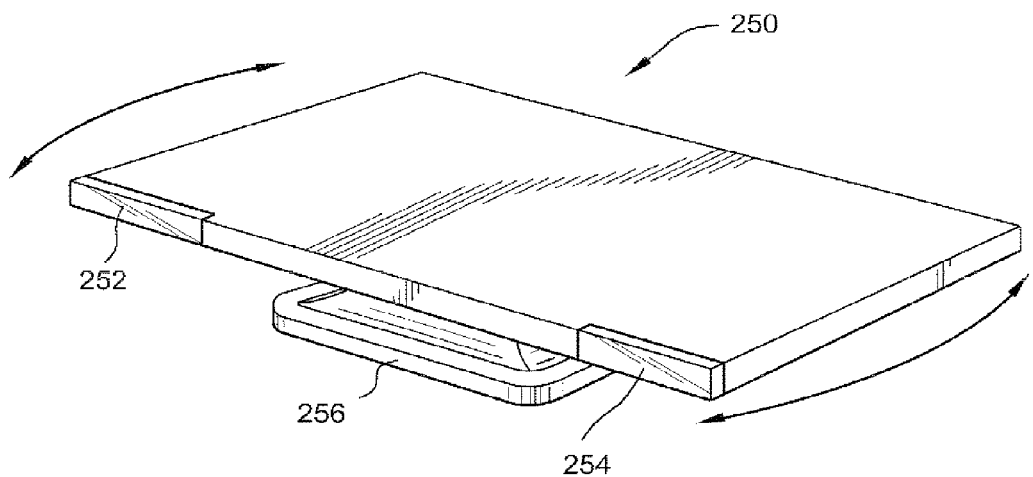
FIGS. 15D & 15E show additional exemplary illustrative non-limiting implementations of the FIG. 1 device to provide pivotable positioning.

FIG. 15D shows a further exemplary illustrative non-limiting implementation of a TV-stand 250 with LED markers built into the face thereof. Marking light from the LEDs escapes though the transparent faceplates 252, 254, and the entire TV-stand 250 can swivel about the base 256 to provide greater player freedom.

Figure 15E:
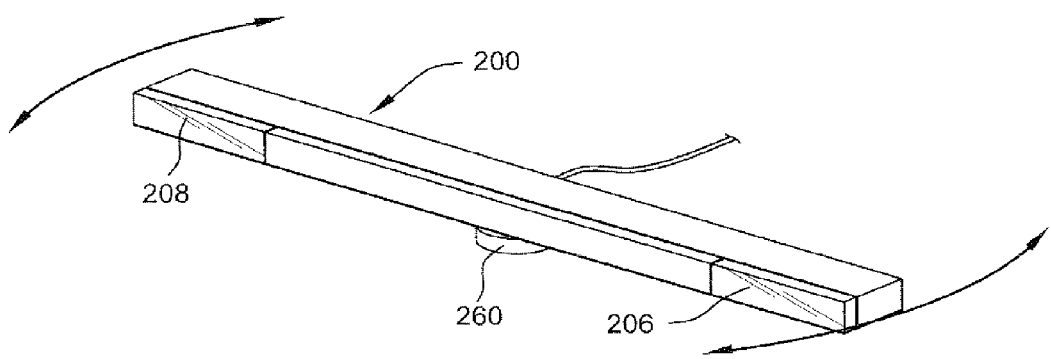

FIG. 15E shows an exemplary illustrative non-limiting implementation wherein the exemplary marking device 200 is attached to a swiveling stand 260. Like the swiveling TV stand shown in FIG. 25, this device allows a player to easily change the orientation of the marking device 200 to aim the LED covers 206, 208 at an initial player starting position. For example, if the room had a side couch from which the player wished to play, instead of having to turn the entire TV, the player could simply rotate the marking device 200 to face the couch or other position.

Figure 16A:
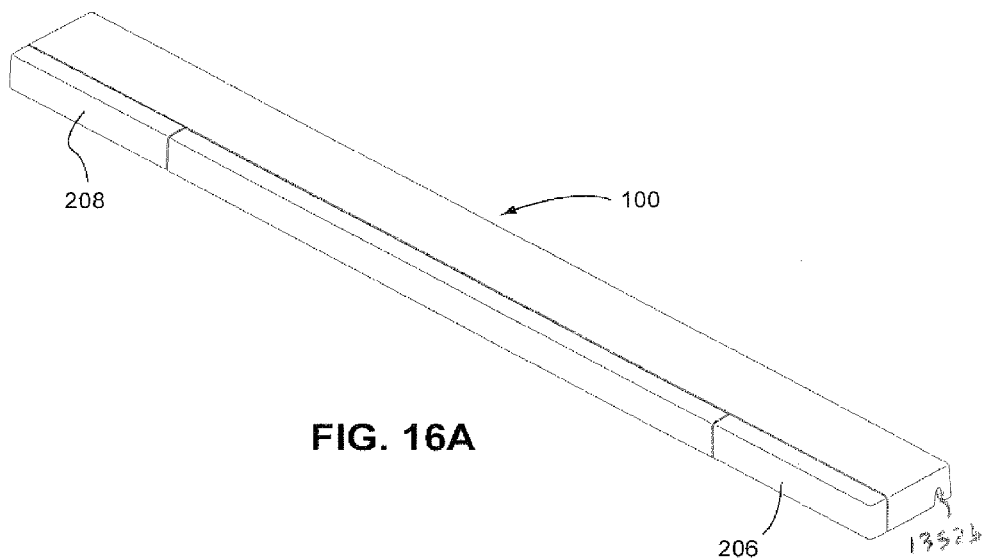
FIGS. 16A-16H show further, more detailed structural views of an exemplary illustrative non-limiting light bar implementation.

FIG. 16A shows an exemplary marking device 100 front, top and right perspective, with infrared filters 206 and 208 visible. From this perspective one can see that light from LED filters 206 and 208 can radiate in many directions, providing a wide marking range. Filters 206, 208 may be plastic material that is opaque to visible light but transmissive to infrared light.

Figure 16B:
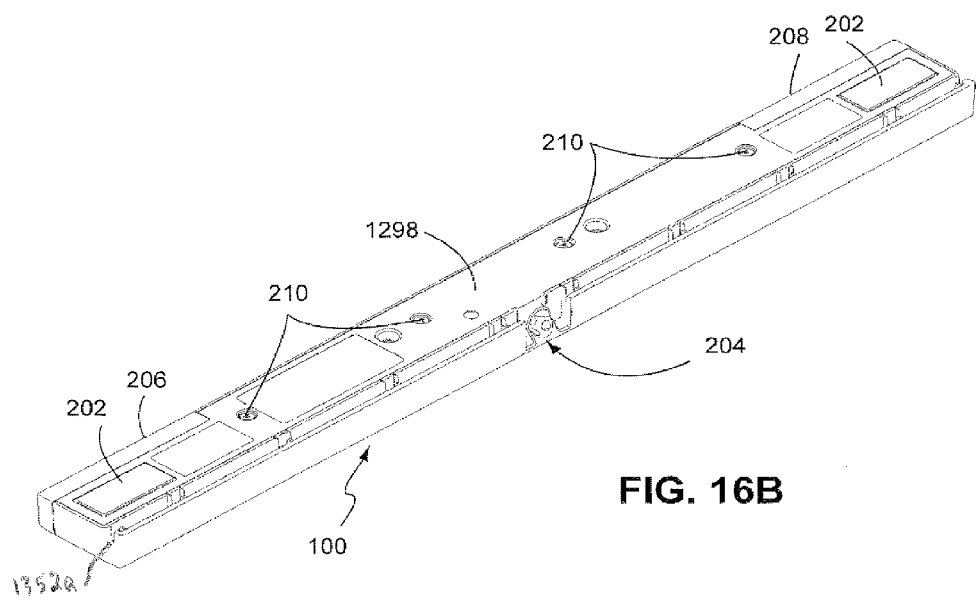

FIG. 16B shows an exemplary marking device 100 rear, bottom and left perspective view. From this angle, the power connection 204, the affixable pieces 202, the threaded fasteners 210 and portions of the LED filters 206, 208 are visible. A lower housing plate 1298 comprise a thin sheet of roughly rectangular plastic having screw holes therein for insertion of the threaded fasteners. Lower housing plate 1298 protects internal components from dirt, dust and moisture, and also provides a surface for applying adhesive tape as described above.

Figure 16C:
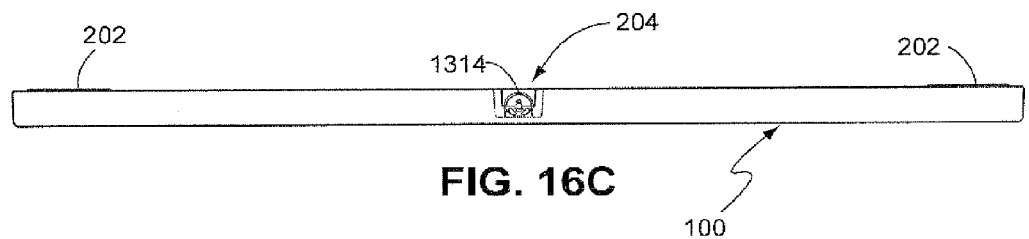

FIG. 16C shows an exemplary marking device 100 rear view.

Seen are an exemplary power connection 204 and affixable piece 202 side profiles. In this exemplary illustrative non-limiting implementation, the affixable pieces are sticky plastic attached to the device 200. When attachment is desired, a user removes a plastic covering (not shown) from the affixable pieces 202 and exposes a sticky coating. The device 202 can then be affixed to a flat or substantially flat surface. This view shows a cable clamp 1314 formed by upper and lower housing portions to securely clamp cable 150.

Figure 16D:
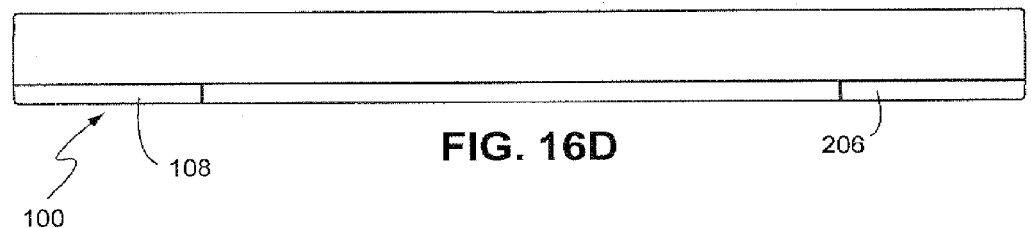

FIG. 16D shows an exemplary marking device 100 top-down view. From this view, the tops of transparent LED filters 206, 208 can be seen. While the housing shown is generally rectangular in shape, any shape of housing may be used.

Figure 16E:
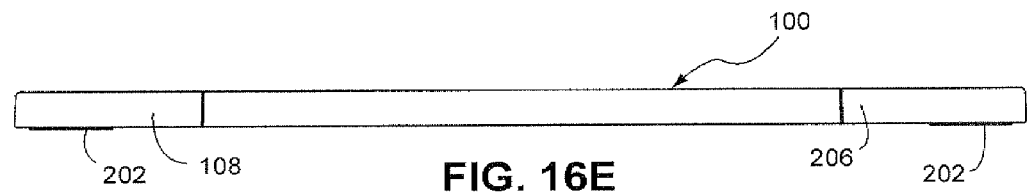

FIG. 16E shows an exemplary marking device 200 front view. Again, the transparent LED coverings 206, 208 can be seen This covering portion is the portion through which most light will escape in this embodiment. A player might orient the device such that these filters 206, 208 are generally facing the player in his initial position, and a player might also ensure that light from these filters 206, 208 is not blocked by interfering objects. An affixable piece 202 side profile can also be seen from the front.

Figure 16F:
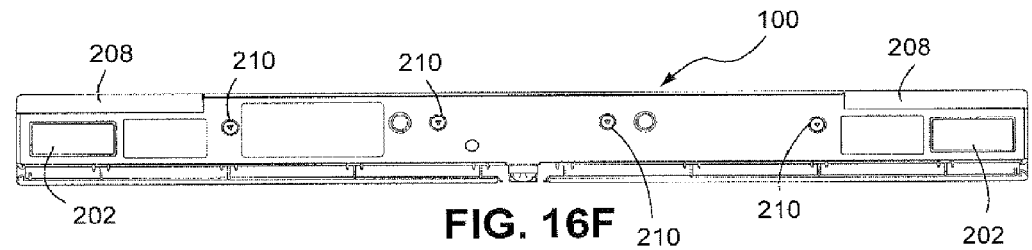

FIG. 16F shows an exemplary marking device 100 bottom-up view. From this view, the affixable pieces 202 are clearly visible in their positions at the opposite marking device ends. These affixable pieces, however, do not need to be included with the device, or they can alternatively be placed at positions other than the ends. A single affixable piece may be used as well, or more than two affixable pieces could be included.

Figure 16G:
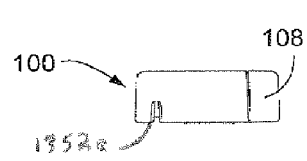
Figure 16H:
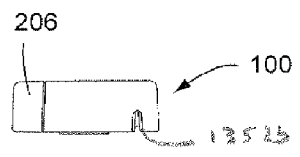

FIGS. 16G and 16H show the exemplary marking device 200 from a left and right side view. In these views, a portion of the transparent LED filters 208 and 206 are visible respectively. Because the transparent LED filters are visible from above, below and to the side, this allows additional light to escape in those directions, giving a wide range of marking. If a narrower marking range were desired, the LED filters could be replaced by faceplate coverings, and solid opaque plastic could be introduced to cover the previously visible side, top and bottom areas.

Figure 17A:
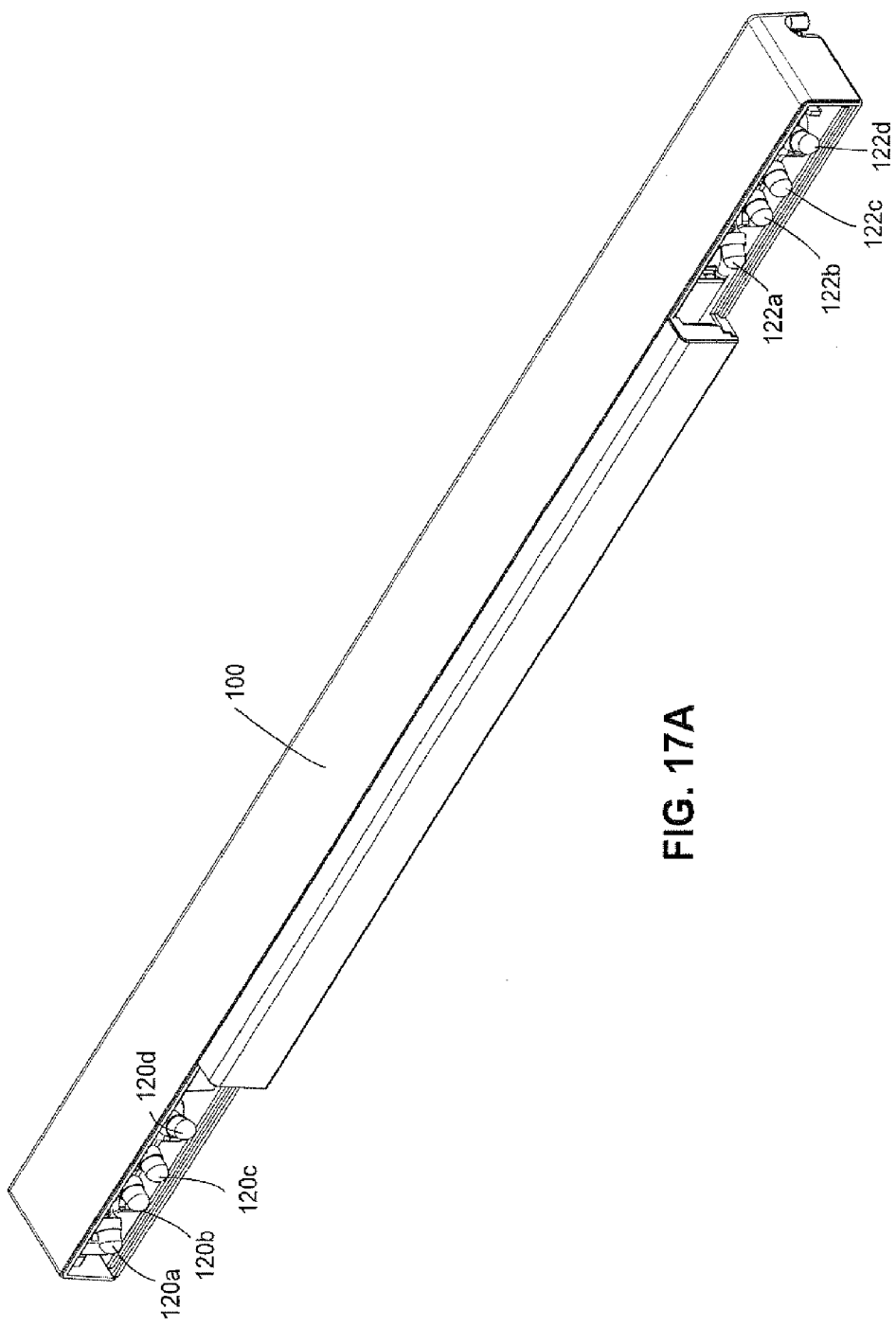
FIG. 17A shows the FIG. 16A device with front filters removed.
Figure 17B:
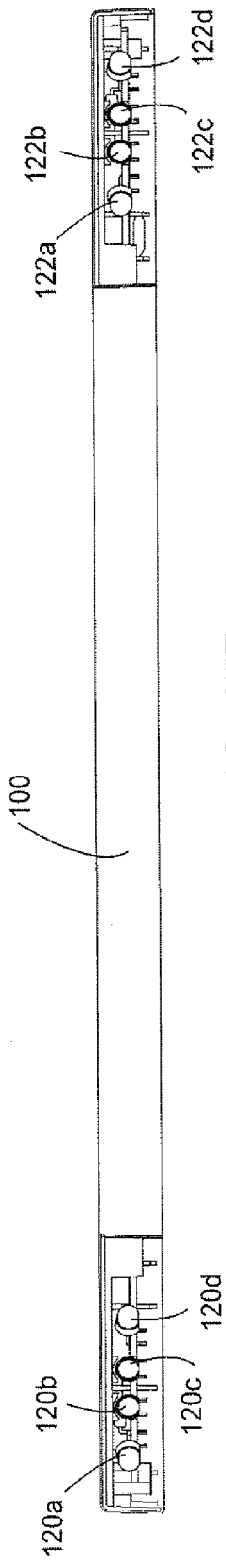
FIG. 17B shows a front perspective view of the device shown in FIG. 17A.

FIG. 17A shows the exemplary marking device 100 with filters 206, 208 removed. One can see the various LEDs oriented as shown. This exemplary marking device 100 is generally held together by a plurality of threaded fasteners 210, although any suitable means of attaching the various pieces together could be used. FIG. 17b shows a front elevated perspective view.

Figure 17C:
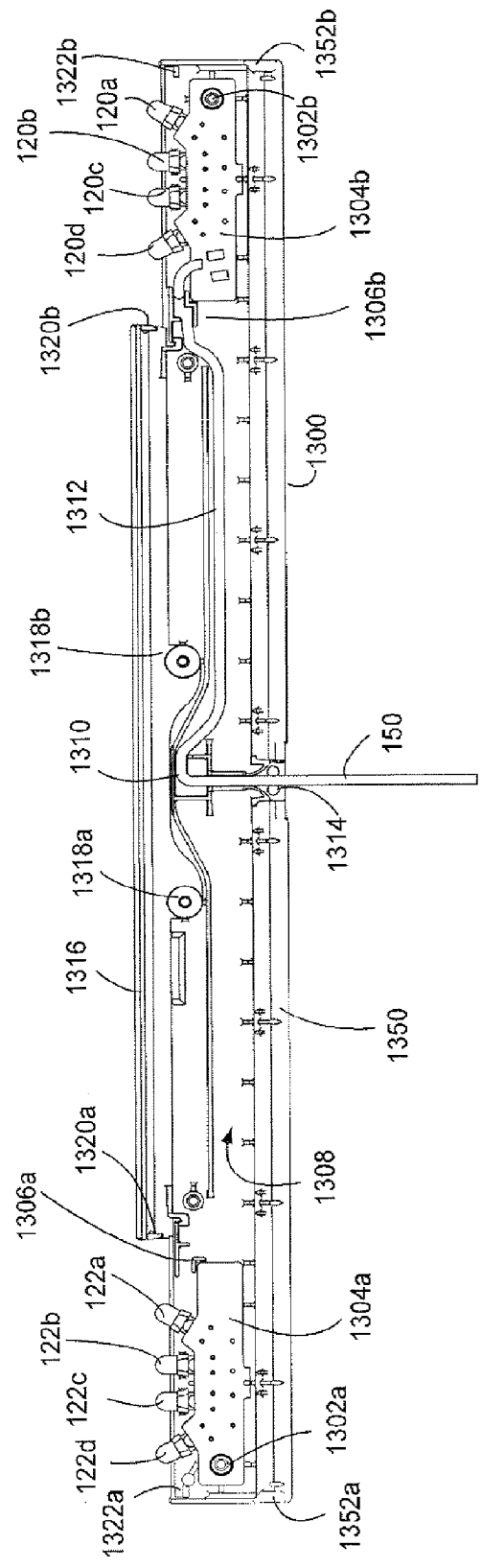
FIG. 17C shows an elevated internal view of the FIG. 17A device.
Figure 17F:
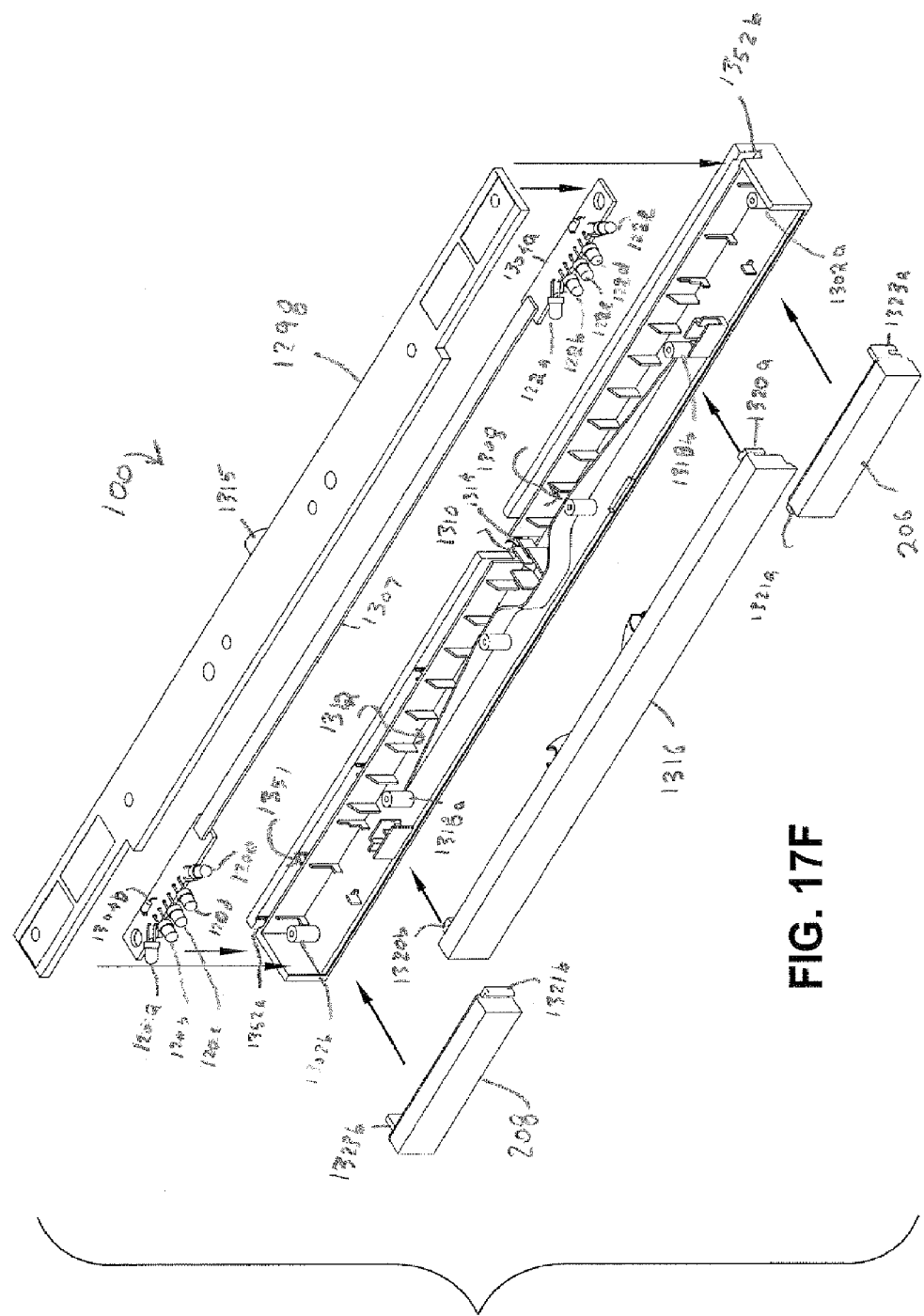
FIGS. 17F and 17G show exemplary illustrative non-limiting exploded views.
Figure 17G:
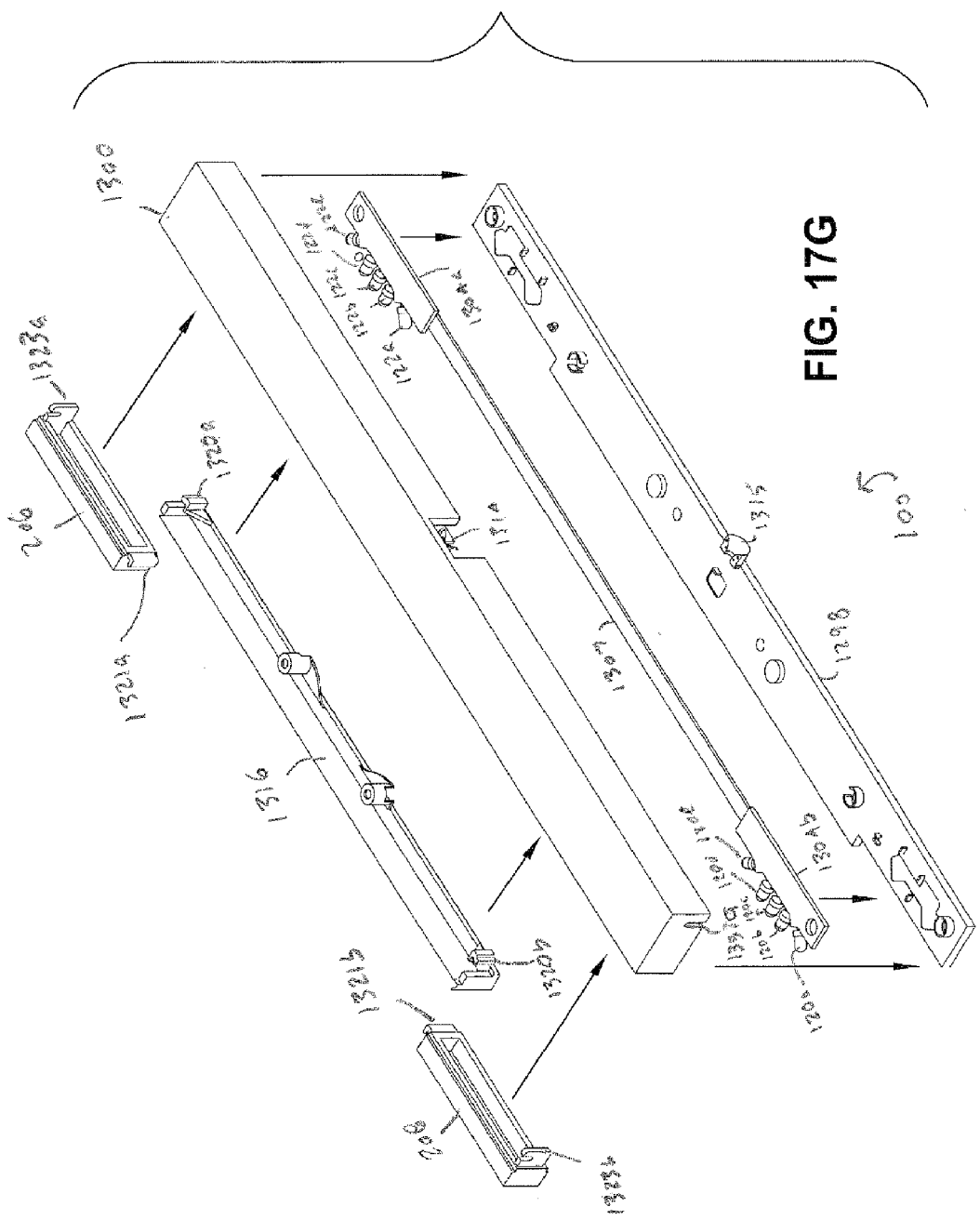

FIG. 17c shows a top plan view of a partially disassembled marking device 100 in which a lower housing plate 1298 has been removed to expose an upper housing cover 1300 (compare this view with the view shown in FIG. 16B). FIG. 17f and FIG. 17g show exploded perspective views. The upper housing cover 1300 includes pins 1302a, 1302b for accepting and mounting printed circuit boards 1304a, 1304b. Additional mounting/retaining corner structures 1306a, 1306b are used to retain printed circuit boards 1304. A channel 1308 retains a flat ribbon cable 1307 (not shown in FIG. 17C; see FIG. 17H) used to connect printed circuit boards 1304. A grooved retaining boxlike structure 1310 may be used to retain a double overhand knot (not shown) tied in cable 150 to prevent the cable from being pulled out of marker bar 100. A portion 1312 of channel 1308 may be used to route cable 150 to printed circuit board 1304b where it can be connected to the printed circuit board by solder connections. The ribbon cable 1307, in turn, connects power from printed circuit board 1304b to printed circuit board 1304a. A further cable clamping device made up in part by a structure 1314 and in part by a mating portion 1315 in the (removed for this Figure) lower housing plate provides additional cable clamping and strain resistance. A separate front piece 1316 held in place by pins 1318 provides an opaque flat front surface that is aesthetically pleasing and also is opaque to infrared radiation to prevent cross-interference between the two point sources. The exemplary length of such a front separate piece 1316 is approximately 6 inches in one exemplary implementation. Front piece 1316 includes locking tangs 1320a, 1320b that interlock with corresponding tabs 1321a, 1321b of filter pieces 206, 208. The filter pieces 206, 208 have additional hinged tabs 1323 that interlock with ridges 1322 molded in top housing portion 1300. A further channel 1350 terminating at each end in slots 1352 running the length of the marker bar 100 is provided to allow the marker bar to be placed over and suspended by a vertically extending edge or the like.

Figure 17H:
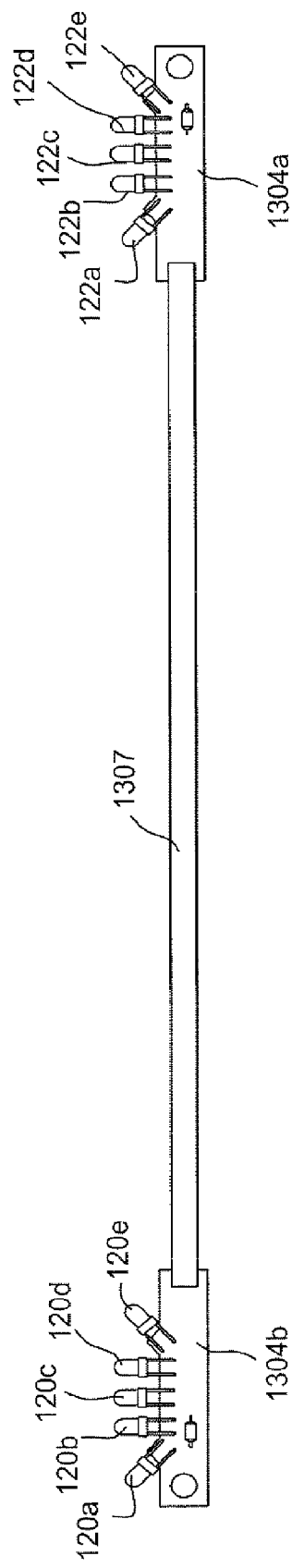
FIG. 17H shows an exemplary illustrative non-limiting implementation of a subassembly having two printed circuit boards coupled together by a ribbon cable.
Figure 17I:
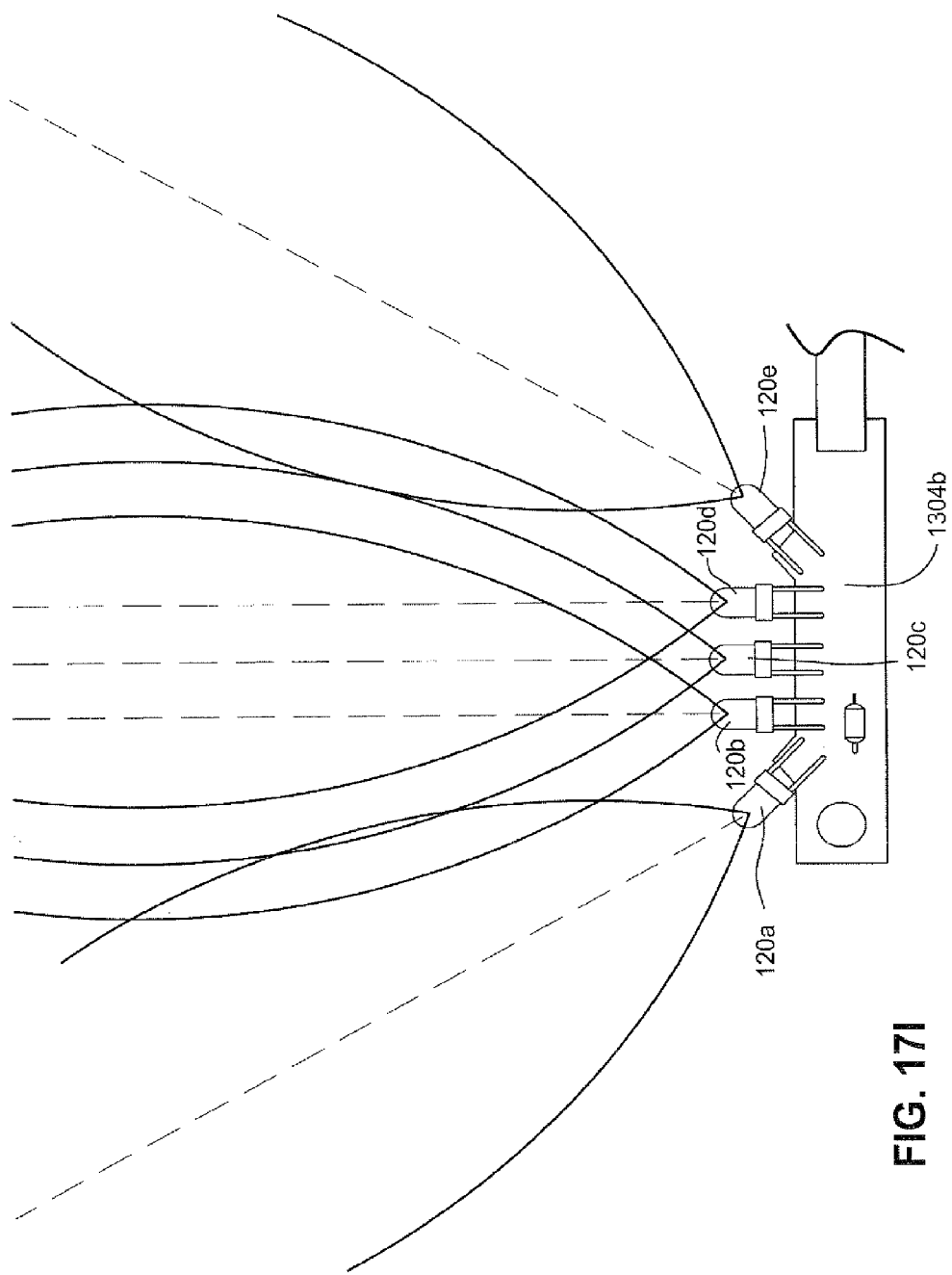
FIG. 17I shows an exemplary illustrative non-limiting point source light array comprising five light emitting diodes with three center diodes emitting in a forward direction and two outside diodes emitting in off-axis directions, and also showing exemplary near field radiation intensity patterns.
Figure 17J:
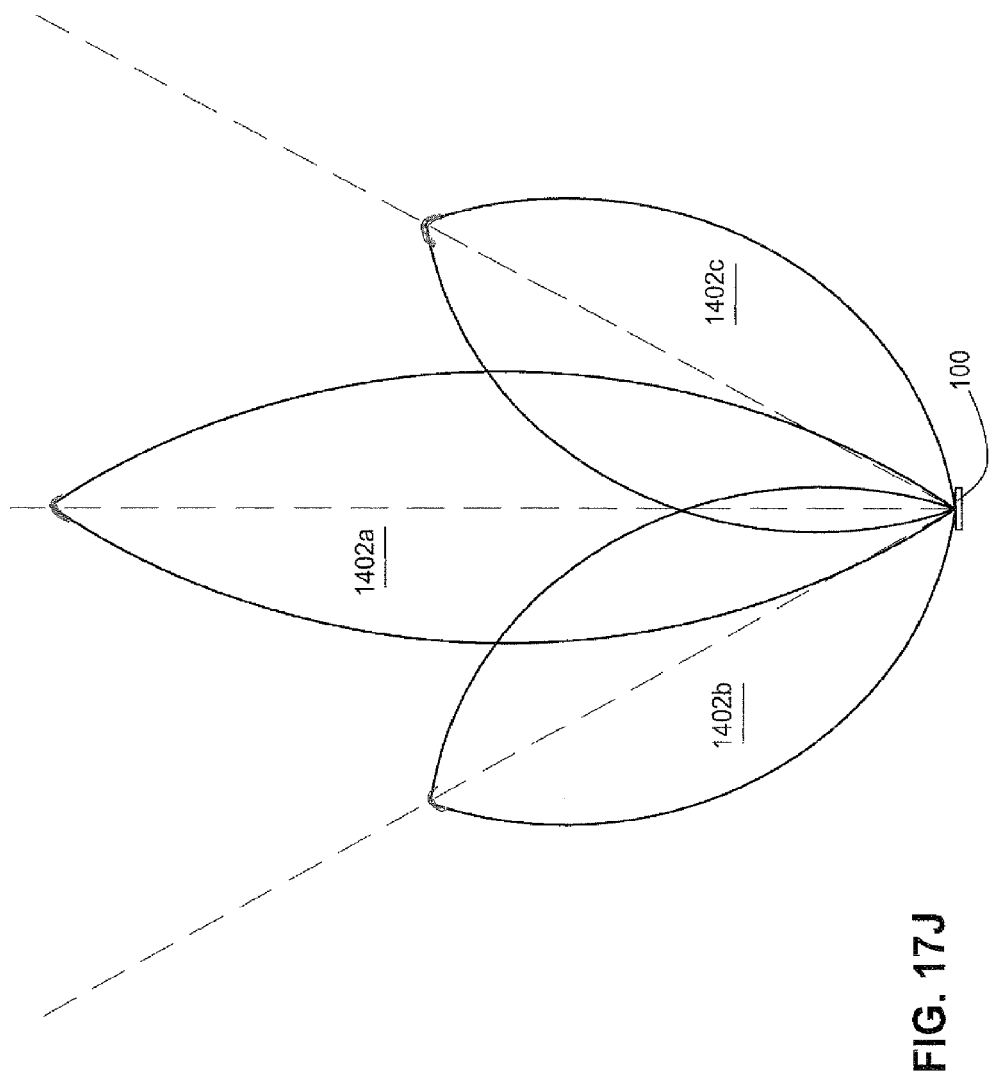
FIG. 17J shows exemplary far field radiation intensity patterns.

FIGS. 17D and 17E show more detailed views of exemplary printed circuit board 1304. FIG. 17H shows a further implementation having five light emitting diodes 120, 122 mounted to each printed circuit board 1304 and connected by ribbon cable 1207. FIG. 17I shows an exemplary near field radiation pattern for five such LEDs 120, and FIG. 17J shows an exemplary far field radiation pattern. The FIG. 17J far field radiation pattern reveals that three LEDs 120b, 120c, 120d mounted to direct radiation perpendicularly to the elongated axis of marker bar 100 provides a higher intensity central lobe 1402 and thereby a greater central axis range. The LEDs 120a, 120b are each aimed off axis to provide additional lobes 1402b, 1402c on each side of the bar 100. Game players more or less directly in front of the display device will thus be able to move fairly far away from the display device (marker bar 100) and still receive infrared radiation at adequate levels. Off axis players who are relatively close to the display device (marker bar 100) will also receive infrared at adequate levels. These radiation patterns ensure that a detector more than a few feet away will recognize each of the LED arrays as a point source. The spacing (e.g., 20 cm or more) between circuit boards 1304a, 1304g ensure that there is no interference between the two point sources on opposite ends of the marker bar 100. The same or different frequencies can be used to provide additional capability to distinguish between the two point sources.

Figure 17K:
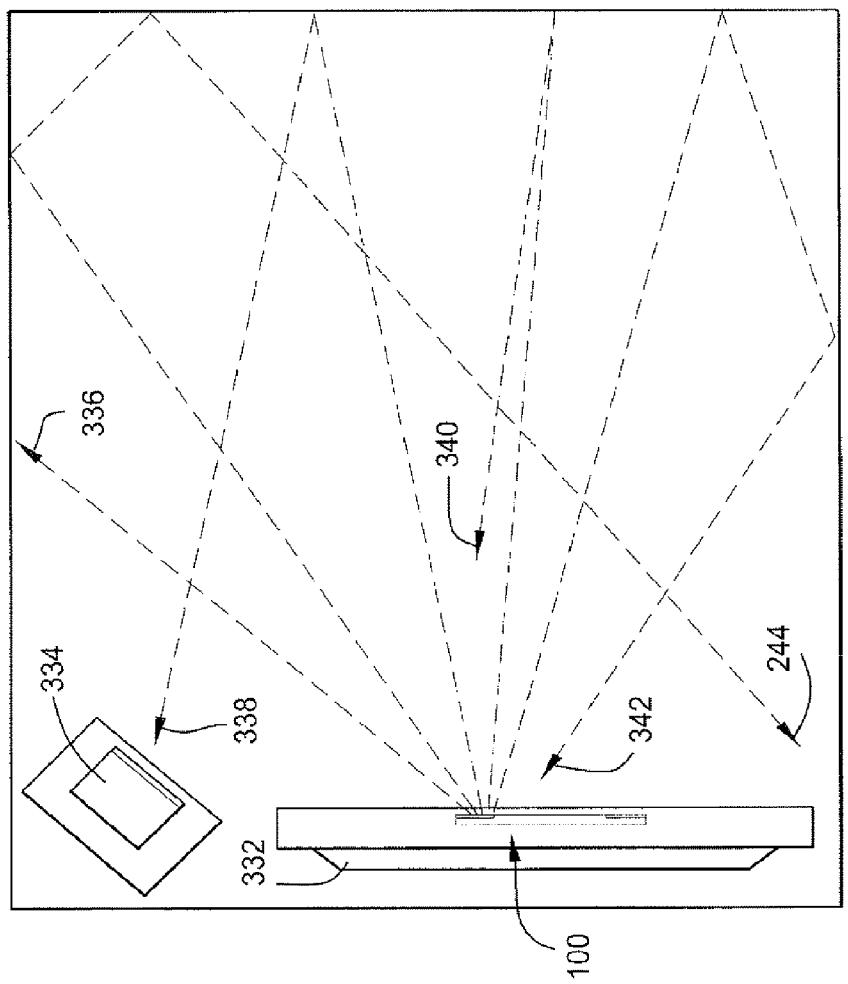
FIG. 17K shows exemplary reflection of radiation emitted by point source arrays from room surfaces back toward a display device.

FIG. 17K shows a TV 332, a cable box 334, and an exemplary illustrative non-limiting marking device 100 resting on top of the TV 332. Exemplary IR signal beams 336, 338, 340, 342, 344 are shown emanating from the marker device 100 and being reflected by walls and other objects in an typical living room or den. Given the wide coverage pattern shown in FIG. 17H, a substantial amount of infrared energy that marker device 100 radiates will typically be reflected all around the room and back in the direction of the marker bar. Some of these reflected signals will strike TV 332 and/or cable box 334. Such reflected signals can be put to use in certain circumstances and applications.

One exemplary illustrative non-limiting application is to use the reflected infrared signals to signal. For example, such reflected signals can be used to remotely control the operation of the television set 332 or other devices in the room. Typical televisions are remotely controlled by continuous wave (CW) modulated (i.e., on/off switched) infrared signals of a certain frequency (e.g., 980 nm). Simple mark-and-space binary codes example are often used to switch IR remote control devices for popular television sets. If the main unit 154 applying power to marker bar 100 were to switch the marker bar 100 on and off at certain encodings, the infrared signals radiated by the marker bar and reflected from the surrounding room back toward the television set could be used to remotely control the television set to perform certain functions (e.g., turn television on and off, control volume, etc.). IR signals can bounce off of players as well as walls, and software within main unit 154 could optionally be used to "flash" the marker bar 100 on and off to provide a conventional remote control function. Software can be provided in the system powering the marking device 100 to allow it to be adapted to control a variety of IR controlled devices, from TVs, to receivers, to cable boxes.

Figure 18:
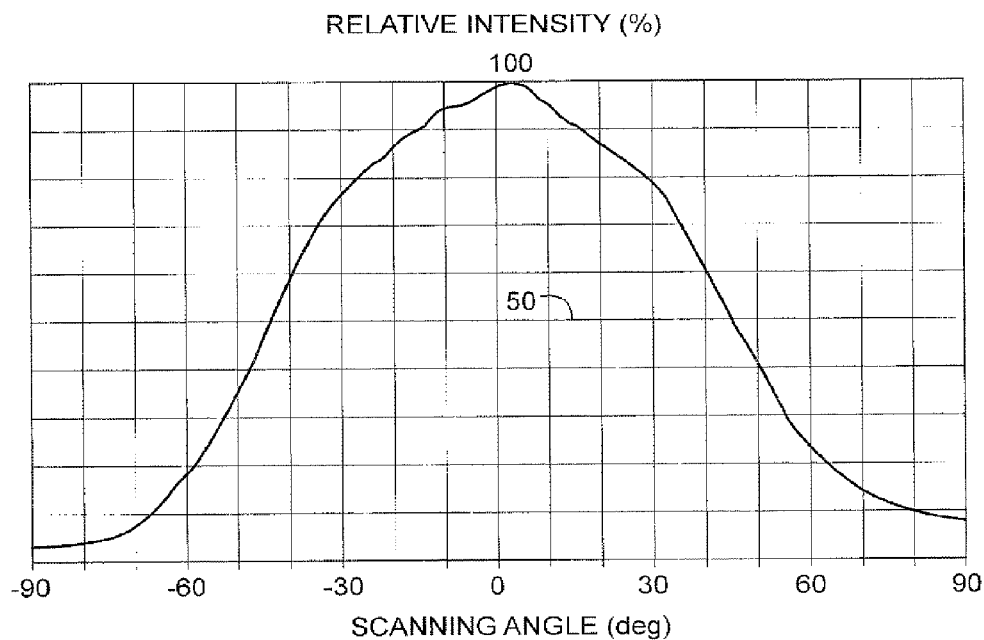
FIG. 18 shows an exemplary illustrative non-limiting radiation pattern for a single light emitting diode.

FIG. 18 shows an exemplary LED relative intensity graph for use with marker bar 100. As can be seen from the graph, the exemplary LED can radiate at 50% intensity over an angle of approximately 42%. As is well known, light emitting diodes 120, 122 are semiconductor devices comprised of for example aluminum-gallium-arsenide (AlGaAs) or other semiconductor material. Such material is typically "doped" with various impurities to provide N-type and P-type regions. An N-type material bonded to a section of P-type material forms a P-N junction. Electrodes are bonded to each end to form a diode, which conducts electricity in only one direction. When no voltage is applied to the diode, electrons from the N-type material fill holes from the P-type material along the junction between the layers, forming a depletion zone. In a depletion zone, the semiconductor material is returned to its original insulating state—all of the holes are filled, so there are no free electrons or empty spaces for electrons, and charge can't flow. When a voltage of appropriate polarity is applied across the diode, unidirectional current flows across the P-N junction. Free electrons moving across a diode can fall into empty holes from the P-type layer. When the electrons are captured by such holes, they experience a drop from the conduction band to a lower orbital within the atoms that capture the electrons. Such electrons release energy in the form of photons. The atoms in this example are arranged so that the electron drops a relatively short distance. As a result, the photon's frequency is so low that it is invisible to the human eye—in the infrared portion of the light spectrum. Different types of doping impurities can provide different frequencies of infrared or other light emissions.

Exemplary specifications for an exemplary LED may be as follows:

Range of temperature and humidity within which operation is assured:
 0 to +60° C.
 0-85% Relative Humidity
Forward current:
 100 mA: 0 to +25° C.
 64 mA: to 60° C
Forward voltage:
 1.3-0.2 v (forward current 30-60 mA, ambient temperature 15-

45° C.)
Radiation intensity:
   min. 9.5 mW (min. 5.0 W/sr at 12 volts, 25 degrees C., 50% relative humidity)
Peak wavelength:
   940 nm
Long-term reliability:
   The half-life period of optical output should possess power of around 80,000 hours.
Directivity angle:
   Approximately ±42 deg.
Safety standard:
   Should satisfy IEC 60825-1 Class 1

Figure 19:
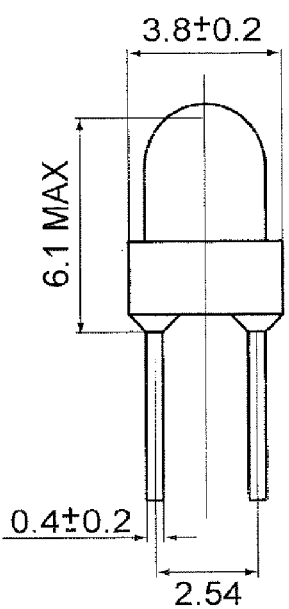
FIG. 19 shows an exemplary illustrative non-limiting light emitting diode physical structure.

FIG. 19 shows the dimensions of an exemplary suitable LED. While these values are for an exemplary LED device, any suitable LED or other source of energy, detectable by a corresponding detection device, may be used in place of the exemplary LED.

Figure 20A:
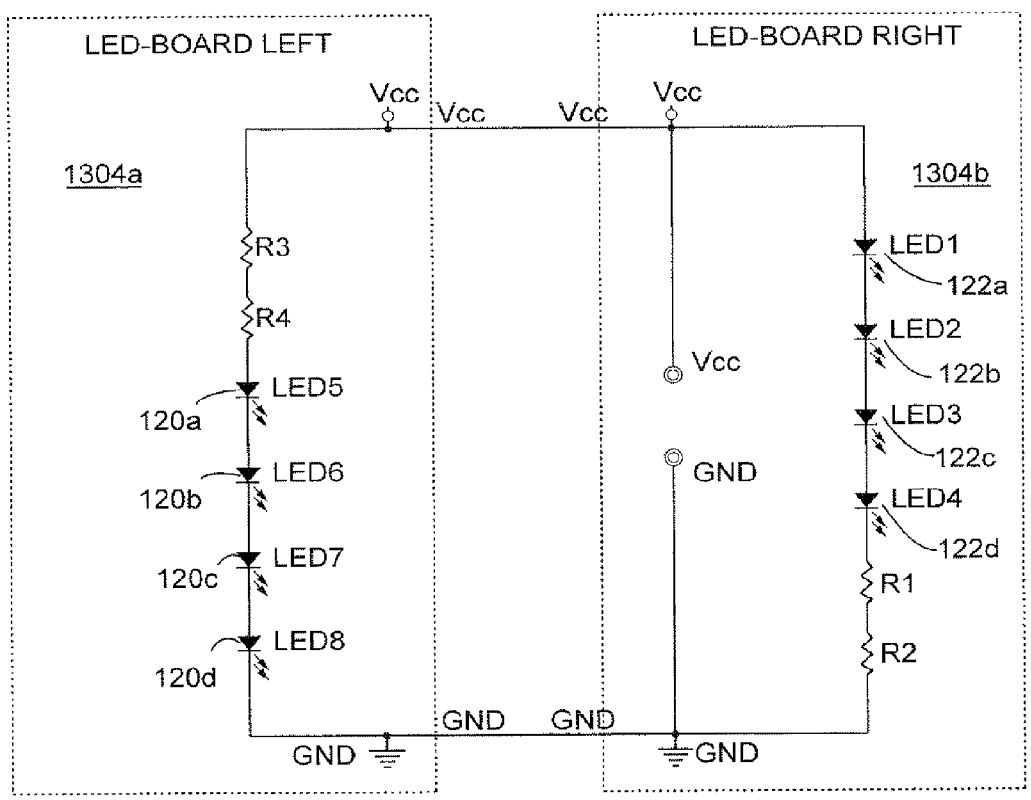
FIGS. 20A and 20B show exemplary illustrative non-limiting schematic circuit diagrams.

FIG. 20A is a schematic electrical circuit diagram of printed circuit boards 1304a, 1304b and the electrical connections therebetween. In each example, the various LEDs (120a-120d, 122a-122d) are connected in series with appropriate resistors R, and the two printed circuit board circuits are connected in parallel. However, other connection arrangements are also possible. In the example illustrative non-limiting implementation shown, a constant power source is connected between Vcc and Ground connections to provide constant illumination of LEDs 120, 122. In other arrangements, switched, pulsed, modulated or other energization could be provided.

Figure 20B:
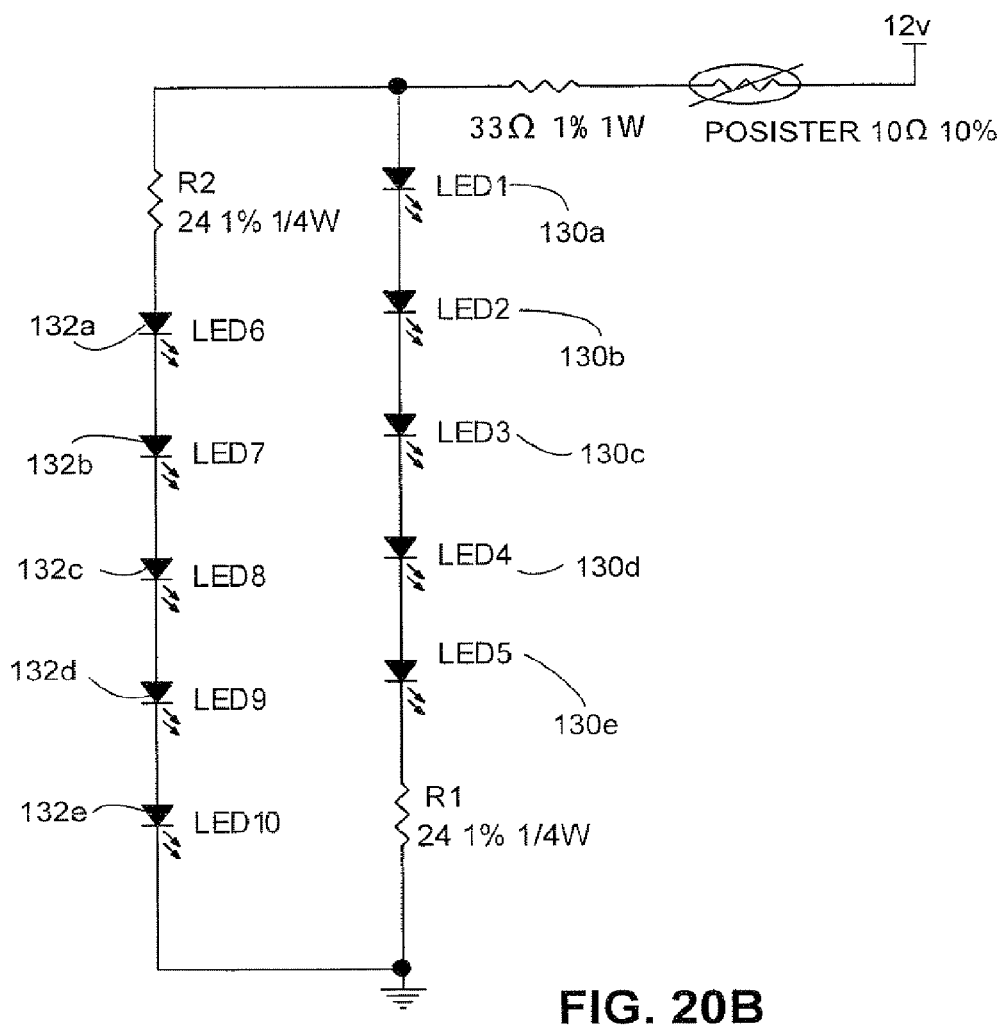

FIG. 20B shows a variation of the FIG. 20B circuit using a posistor for temperature compensation. Different circuit configurations with different numbers and types of LEDs are possible.

ALTERNATIVE EXEMPLARY NON-LIMITING IMPLEMENTATIONS

Figure 21A:
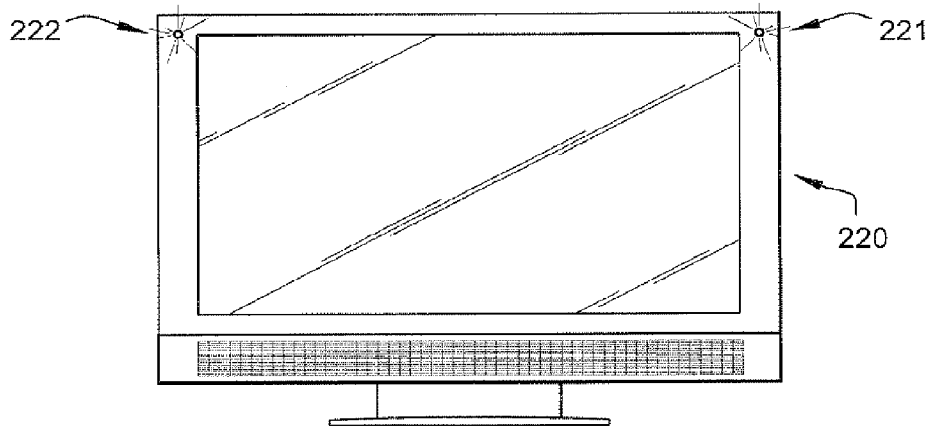
FIGS. 21A-21C show alternative implementations providing point sources integral to a display device housing.
Figure 21B:
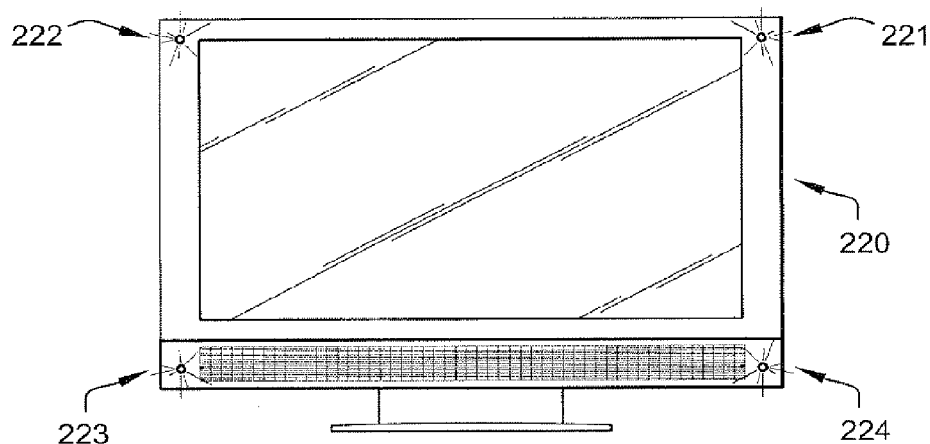
Figure 21C:
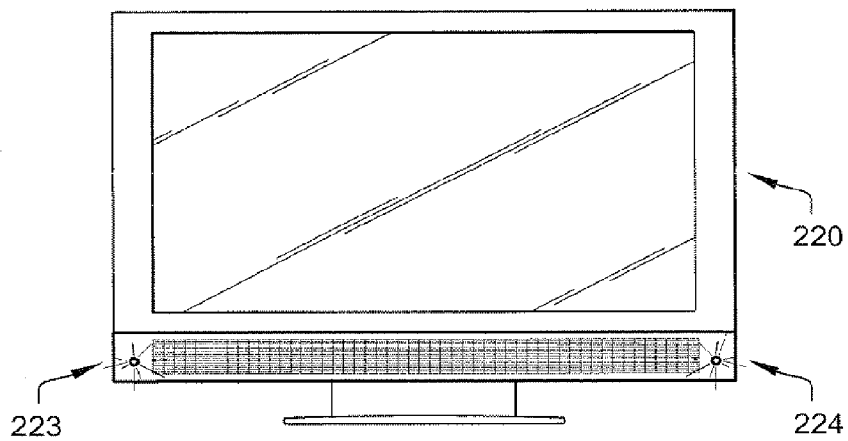

FIGS. 21a-21c show a television with LED marking devices built into the TV casing face. In FIG. 21a, the LED devices 221 and 222 are built into the TV casing face's upper corners. FIG. 21b shows a configuration where the LED devices 221, 222, 223, 224 are built into all four corners of the TV casing face. In FIG. 21c, the LED devices 223 and 224 are built into the TV face's lower corners. While the devices in FIGS. 21a-21c appear to be single LEDs, any LED configuration could be affixed to the television. Arrays such as those described above could be used for example.

FIG. 22 shows another exemplary illustrative non-limiting marking device 310. Here an array 312 of IR LEDs is disc-shaped, and provides 360 degrees of coverage (omnidirectional). The two units shown would need to be separated sufficiently to provide point source separation. Unlike the marking device 100 described above, these housings have arrays that are not a fixed distance apart. The housings can be attached to cords. Devices such as these can be useful where the marking device is set up in a cluttered area.

Figure 23:
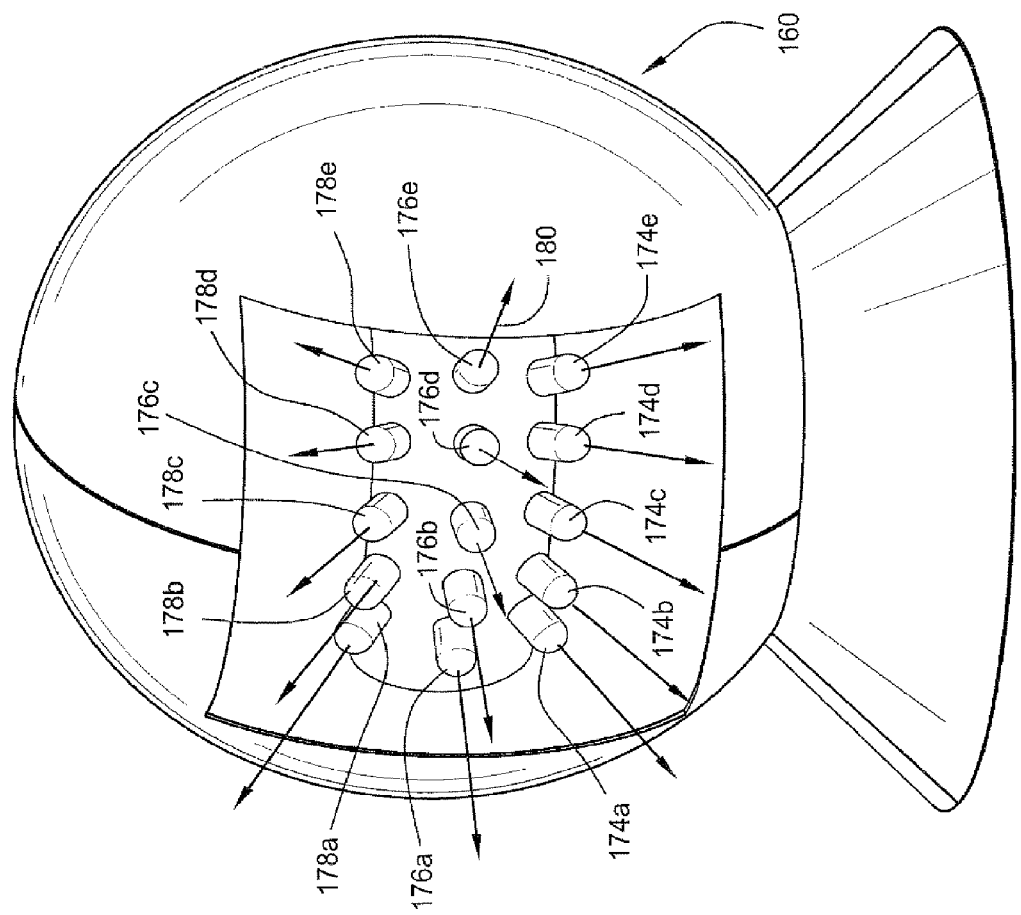
FIG. 23 shows an exemplary illustrative non-limiting three-dimensional light emitting array.

FIG. 23 shows a further exemplary marking device 160. In this exemplary implementation, the device is provided with three rows of LEDs comprising a 3D array. The first row has five LEDs 174a, 174b 174c, 174d, 174e. The first row LEDs are pointed at a downward angle with respect to the horizontal plane. The second row, which is substantially parallel with the horizontal plane, similarly has five LEDs 176a, 176b, 176c, 176d 176e. The third row has five LEDs 178a, 178b, 178c, 178d, 178e, pointed at a generally upward angle with respect to the horizontal plane. In addition to the direction the LEDs are arranged with respect to the horizontal plane, each row of LEDs has one LED facing leftward and one facing rightward. This exemplary configuration provides an expansive coverage area at additional manufacturing cost and power requirements.

FIG. 24 shows two exemplary tower LED markers 230, 232 on either side of a television set. Each exemplary marker 230, 232 has a plurality of LED light points 234a, 234b, 236a, 236b. A configuration such as this allows for a large range of vertical and/or horizontal detection. Both exemplary markers 230, 232 are set within stands 238, but any suitable support method, such as affixation to the TV's sides, could be used.

In one exemplary illustrative non-limiting implementation, a user may wish to verify that there are no bright light sources, including sunlight, behind or near the TV, shining towards the remote device or reflecting off the TV screen. It may be desirable to avoid sources of infrared light in the gameplay area such as electric, propane or kerosene heaters, flames from fireplaces or candles, and stoves or other sources of heat. If there are bright lights shining directly behind the TV or on the screen, it may be best to turn the lights off. A user may wish to make sure that the marker bar 100 is setup correctly. To do this, it may be desirable to check the cord on the marker bar for any frayed wires or kinks, and verify that the marker bar is free of obstructions. It may also be desirable to verify that the remote sensing device is being used between 3 and 8 feet directly in front of the TV, and that the marker bar is placed properly.

In one exemplary illustrative non-limiting implementation, it may also be desirable to make sure that the marker bar sensitivity is properly set. This sensitivity may be a property of a remote detecting device as opposed to the marker bar itself. The marker bar sensitivity determines the distance the player can be from the TV. If you move out of the range of the Marker bar the cursor can become erratic. The higher the sensitivity is set, the more susceptible the marker bar is to light and infrared heat sources. It may be useful to make sure there are no bright light sources, including sunlight, behind or near the TV, shining towards the remote or reflecting off the TV screen. It may be desirable to avoid sources of infrared light in the gameplay area such as electric, propane or kerosene heaters, flames from fireplaces or candles, and stoves or other sources of heat.

In one exemplary illustrative non-limiting implementation, it may also be desirable to verify Sensitivity Setting dots. To do this, it is possible to go to the Marker bar's sensitivity setting in a user interface associated with the remote sensing device. If only one or no dots appear on the sensitivity screen, there is likely a problem with the Marker bar. If there are more than two dots, then it appears there is an additional light or infrared heat source being picked up by the remote. Once again, it may desirable under some circumstances to avoid sources of infrared light in the gameplay area such as electric, propane or kerosene heaters, flames from fireplaces or candles, and stoves or other sources of heat. If both dots appear and the erratic behavior continues even when you move closer to the TV, there could be a problem with the remote sensing device.

It is to be understood that the invention is not to be limited to the disclosed exemplary illustrative non-limiting implementations. On the contrary, the invention is intended to cover various modifications and equivalent arrangements included within the scope of the claims.

We claim:

1. A gaming system, comprising:
an infrared light emitting bar configured to transmit infrared light, the bar comprising:
an elongated linear-shaped housing having first and second ends, at least a portion of said housing being infrared-light transmissive;
a first plurality of infrared light emitters disposed within the housing substantially at the housing first end;
a second plurality of infrared light emitters disposed within the housing substantially at the housing second end and spaced apart from the first plurality of infrared light emitters, the first and second pluralities of infrared light emitters being arranged to transmit infrared light through the infrared-light transmissive housing portion towards a player of a videogame being displayed on a display device coupled to the gaming system; and
an electrically-conductive wire entering the housing and connected to commonly activate the first and second pluralities of the infrared light emitters;
a handheld videogame controller comprising:
an optical detector configured to detect infrared light emitted by the first and second pluralities of infrared light emitters; and
a wireless transmitter operatively coupled to the optical detector and configured to wirelessly transmit indications based on the infrared light detected by the optical detector; and
a videogame main unit comprising:
a wireless receiving device configured to wirelessly receive the transmitted indications from the wireless transmitter;
a non-transitory memory device configured to store a software algorithm; and
a processor, which upon executing the software algorithm, is configured to (i) ascertain real-time continuous aspects of at least a position and a pointing orientation of the optical detector relative to the light emitting bar based on the transmitted indications, and (ii) based on the real-time continuous aspects of at least the position and the pointing orientation, operate a game object of the videogame being displayed on the display device coupled to the gaming system;
wherein the housing is configured so that the optical detector can sense infrared light emitted by the first and second pluralities of infrared light emitters even when the optical detector is substantially off axis with respect to a direction perpendicular to the housing light-transmissive portion.

2. The gaming system of claim 1, wherein the wire is configured to connect the bar to the videogame main unit and videogame main unit is structured to supply power to the bar via the wire when the wire is connected thereto.

3. The gaming system of claim 1, further including an elongated printed circuit board disposed within the housing, the printed circuit board having first and second ends with the first plurality of infrared light emitters disposed at the printed circuit board first end and the second plurality of infrared light emitters disposed at the printed circuit board second end.

4. The gaming system of claim 1, wherein the videogame main unit is configured to turn the bar on and off at specified encodings.

5. The gaming system of claim 1, wherein the bar is configured to radiate the infrared light at a frequency of 940 nanometers.

6. The gaming system of claim 1, wherein the housing is dimensioned to space apart first and second infrared filtering windows by at least 20 centimeters.

7. The gaming system of claim 1, wherein the housing comprises a rectangular trough defining a side that is at least partially open, the infrared-light transmissive housing portion being planar and disposed to cover one or more open parts of the trough side.

8. The gaming system of claim 1, wherein each of the first and second pluralities of light emitters comprises at least three discrete light emitters.

9. The gaming system of claim 1, wherein the first plurality of light emitters is arrayed in the same orientation as the second plurality of light emitters.

10. The gaming system of claim 1, wherein the first plurality of light emitters are directional.

11. The gaming system of claim 1, further including an activation circuit coupled to the electrically-conductive wire, the activation circuit being structured to supply encoded information for selectively activating said first and second pluralities of light emitters to emit encoded infrared signaling.

12. The gaming system of claim 1, wherein the light emitters of the first plurality are disposed adjacent one another along an axis, and the light emitters of the second plurality are disposed adjacent one another along the same axis but spaced apart from the light emitters of the first plurality.

13. The gaming system of claim 1, wherein the wireless transmitter transmits coordinates of the optical detector to the wireless receiving device.

14. The gaming system of claim 1, wherein the processor is further configured, by the software algorithm, to determine, based on the transmitted indications, an aspect of distance between the optical detector and the infrared light emitting bar.

15. The gaming system of claim 1, wherein the processor is further configured, by the software algorithm, to determine, based on the transmitted indications, an aspect of twist orientation of the optical detector relative to the infrared light emitting bar.

16. The gaming system of claim 1, further comprising a stand for supporting the infrared light emitting bar.

17. The gaming system of claim 1, wherein the first and second pluralities of infrared light emitters mark spatial positions, and the optical detector detects said marked spatial positions.

18. The gaming system of claim 1, wherein display device is selected from the group consisting of a first display device and a second display device, wherein the second display device is sized differently than the first display device.

19. The gaming system of claim 1, wherein the light-transmissive housing portion comprises a plastic faceplate infrared filter.

20. The gaming system of claim 1, wherein the housing is configured to radiate modulated infrared waves toward the display device, wherein the display device is an infrared-controlled television that can be controlled by said modulated waves.

21. The gaming system of claim 1, wherein the light emitters of the first plurality of light emitters are comprised of aluminum-gallium-arsenide (AlGaAs) semiconductor material.

22. The gaming system of claim 1, wherein the handheld videogame controller further comprises a vibration generator coupled to the wireless transmitter, the vibration generator providing a tactile sensation.

23. The gaming system of claim 1, further comprising a keyboard for text entry applications.

24. The gaming system of claim 1, further comprising an element that is sensitive to touch input by the player.

25. The gaming system of claim 1, further comprising a device that is responsive to voice input.

26. The gaming system of claim 1, wherein the optical detector and wireless transmitter are disposed in an expansion module that modularly connects to an additional handheld device providing at least one user input button and a touchpad, the expansion module and additional handheld device sharing an electrical power source.

\* \* \* \* \*